US012645125B2

(12) United States Patent
Slack et al.

(10) Patent No.: US 12,645,125 B2
(45) Date of Patent: Jun. 2, 2026

(54) GLAZING UNIT WITH OPTICAL MODULATION AND RECEPTION OF RADIO FREQUENCY SIGNAL

(71) Applicant: eLstar Dynamics Patents B.V., Rockanje (NL)

(72) Inventors: Anthony John Slack, Lorgues (FR); Romaric Mathieu Massard, Eindhoven (NL); David Richard Thomas, Opio (FR)

(73) Assignee: ELSTAR DYNAMICS PATENTS B.V., Rockanje (NL)

( * ) Notice: Subject to any disclaimer, the term of this patent is extended or adjusted under 35 U.S.C. 154(b) by 0 days.

(21) Appl. No.: 19/102,284

(22) PCT Filed: Jul. 13, 2023

(86) PCT No.: PCT/EP2023/069486
§ 371 (c)(1),
(2) Date: Feb. 7, 2025

(87) PCT Pub. No.: WO2024/033009
PCT Pub. Date: Feb. 15, 2024

(65) Prior Publication Data
US 2025/0258416 A1      Aug. 14, 2025

(30) Foreign Application Priority Data

Aug. 11, 2022    (EP) ..................................... 22190032

(51) Int. Cl.
*G02F 1/167* (2019.01)
*E06B 9/24* (2006.01)
(Continued)

(52) U.S. Cl.
CPC ................ *G02F 1/167* (2013.01); *E06B 9/24* (2013.01); *G02F 1/16761* (2019.01);
(Continued)

(58) Field of Classification Search
CPC ...... G02F 1/167; G02F 1/172; G02F 1/16761; G02F 1/134381; G02F 1/1676; G02F 2201/12; G02B 26/06; G02B 2207/101
See application file for complete search history.

(56) References Cited

U.S. PATENT DOCUMENTS

| | | | |
|---|---|---|---|
| 4,680,103 A | 7/1987 | Beilin Solomon I. et al. |
| 5,161,048 A | 11/1992 | Rukavina |
| | (Continued) | | |

FOREIGN PATENT DOCUMENTS

| | | |
|---|---|---|
| CN | 101002129 A | 7/2007 |
| CN | 101446728 A | 6/2009 |
| | (Continued) | |

OTHER PUBLICATIONS

International Search Report (PCT/ISA/210) and Written Opinion issued in PCT Application No. PCT/EP2023/085381 dated Feb. 26, 2024 (16 pages).

(Continued)

*Primary Examiner* — Brandi N Thomas
(74) *Attorney, Agent, or Firm* — Crowell & Moring LLP

(57) ABSTRACT

A glazing unit (101) is provided configured for reception of radio frequency signals, the glazing unit (101) has an optical layer (143) including electrophoretic charged particles and being arranged between a first substrate (141) and a second substrate (142), electrodes (122, 123) on the substrates (141, 142) cooperate in the electrophoretic modulation of the charged particles' position causing modulation of light passing through the glazing unit (101). The glazing unit (101) has at least one antenna (121) for reception of a radio frequency signal. The antenna (121) may be arranged on a side of a substrate (141, 142) or on a side of a pane (111, 112), e.g., glass pane.

19 Claims, 19 Drawing Sheets

(51) Int. Cl.
    *G02F 1/16761*     (2019.01)
    *G02F 1/1685*     (2019.01)

(52) U.S. Cl.
    CPC .... *G02F 1/1685* (2019.01); *E06B 2009/2405* (2013.01); *E06B 2009/2417* (2013.01); *E06B 2009/2464* (2013.01); *G02F 2201/124* (2013.01)

(56) References Cited

U.S. PATENT DOCUMENTS

| | | | |
|---|---|---|---|
| 6,618,109 B2 | 9/2003 | Hidehira et al. | |
| 6,631,022 B1 | 10/2003 | Kihira | |
| 6,970,226 B2 | 11/2005 | Yu et al. | |
| 7,116,466 B2 | 10/2006 | Whitesides et al. | |
| 7,177,002 B2 | 2/2007 | Matsumoto et al. | |
| 7,362,400 B2 | 4/2008 | Itou et al. | |
| 8,018,430 B2 | 9/2011 | Choi et al. | |
| 8,054,535 B2 | 11/2011 | Sikharulidze et al. | |
| 8,384,658 B2 | 2/2013 | Albert et al. | |
| 8,384,659 B2 | 2/2013 | Yeo et al. | |
| 8,446,663 B2 | 5/2013 | Kim et al. | |
| 8,514,481 B2 | 8/2013 | Yeo et al. | |
| 8,520,286 B2 | 8/2013 | Clapp et al. | |
| 8,950,162 B2 | 2/2015 | Miller et al. | |
| 9,013,780 B2 | 4/2015 | Henzen et al. | |
| 9,075,281 B2 | 7/2015 | Kato et al. | |
| 9,176,347 B2 | 11/2015 | Peng et al. | |
| 9,201,282 B2 | 12/2015 | Henzen | |
| 9,361,836 B1 | 6/2016 | Telfer et al. | |
| 10,921,678 B2 | 2/2021 | van de Kamer | |
| 11,030,969 B2 | 6/2021 | Sainis et al. | |
| 11,095,040 B2 | 8/2021 | Sonoda | |
| 11,099,451 B1* | 8/2021 | Massard | G02F 1/167 |
| 2004/0036944 A1 | 2/2004 | Tsu | |
| 2004/0057005 A1 | 3/2004 | Matsumoto et al. | |
| 2004/0145696 A1* | 7/2004 | Oue et al. | G02F 1/1679 |
| | | | 349/167 |
| 2005/0185104 A1 | 8/2005 | Weisbuch et al. | |
| 2005/0213191 A1* | 9/2005 | Whitesides et al. | G02F 1/1677 |
| | | | 359/296 |
| 2005/0237897 A1 | 10/2005 | Takaki et al. | |
| 2007/0046621 A1 | 3/2007 | Suwabe et al. | |
| 2007/0291808 A1 | 12/2007 | Ledentsov | |
| 2009/0040192 A1 | 2/2009 | Haga | |
| 2009/0321265 A1 | 12/2009 | Stancovski | |
| 2010/0321346 A1 | 12/2010 | Chae et al. | |
| 2011/0102881 A1 | 5/2011 | Verschueren et al. | |
| 2011/0249933 A1 | 10/2011 | Nair | |
| 2011/0261432 A1 | 10/2011 | Yamazaki | |
| 2011/0290649 A1* | 12/2011 | Hamada et al. | B03C 5/026 |
| | | | 204/547 |
| 2011/0304529 A1 | 12/2011 | Yeo et al. | |
| 2012/0024375 A1 | 2/2012 | Mader | |
| 2012/0068990 A1 | 3/2012 | Moriyama et al. | |
| 2012/0087389 A1 | 4/2012 | Howe | |
| 2012/0090976 A1 | 4/2012 | Kobayashi et al. | |
| 2013/0016420 A1 | 1/2013 | Yeo et al. | |
| 2014/0061049 A1 | 3/2014 | Lo | |
| 2014/0104155 A1 | 4/2014 | Long | |
| 2014/0160412 A1 | 6/2014 | Peng et al. | |
| 2015/0268593 A1 | 9/2015 | Sasaki et al. | |
| 2016/0004368 A1 | 1/2016 | Kurasawa | |
| 2016/0071465 A1 | 3/2016 | Hung et al. | |
| 2016/0161780 A1 | 6/2016 | Van Oosten et al. | |
| 2016/0187755 A1 | 6/2016 | Kasegawa | |
| 2017/0061895 A1 | 3/2017 | Paolini, Jr. et al. | |
| 2017/0107753 A1 | 4/2017 | Koga et al. | |
| 2017/0301273 A1 | 10/2017 | Atkinson et al. | |
| 2018/0116712 A1 | 5/2018 | Dong et al. | |
| 2018/0239211 A1 | 8/2018 | Teranishi et al. | |
| 2018/0247598 A1 | 8/2018 | Sainis | |
| 2019/0302564 A1 | 10/2019 | van de Kamer | |
| 2019/0324343 A1 | 10/2019 | Atkinson et al. | |
| 2020/0066924 A1* | 2/2020 | Tombs et al. | H10F 19/80 |
| 2020/0249538 A1* | 8/2020 | Massard | G02F 1/1676 |
| 2020/0249539 A1 | 8/2020 | Massard | |
| 2020/0347666 A1* | 11/2020 | Kim et al. | E06B 3/6736 |
| 2020/0355975 A1* | 11/2020 | Vivier | B32B 27/306 |
| 2021/0055321 A1 | 2/2021 | deKoninck et al. | |
| 2021/0055621 A1 | 2/2021 | Massard | |
| 2021/0058122 A1 | 2/2021 | Shinkawa et al. | |
| 2021/0141259 A1 | 5/2021 | Yoshino | |
| 2021/0149265 A1 | 5/2021 | Bergh et al. | |
| 2021/0181594 A1 | 6/2021 | Jain et al. | |
| 2021/0312846 A1 | 10/2021 | Atkinson et al. | |
| 2021/0373392 A1 | 12/2021 | Nie et al. | |
| 2022/0035222 A1 | 2/2022 | Massard et al. | |
| 2022/0365382 A1 | 11/2022 | Komitov et al. | |
| 2023/0194946 A1 | 6/2023 | Neyts et al. | |
| 2024/0069403 A1 | 2/2024 | Lu et al. | |

FOREIGN PATENT DOCUMENTS

| | | |
|---|---|---|
| CN | 101675379 | 3/2010 |
| CN | 102187271 A | 9/2011 |
| CN | 102314038 A | 1/2012 |
| CN | 102597864 A | 7/2012 |
| CN | 102668015 A | 9/2012 |
| CN | 102725683 A | 10/2012 |
| CN | 106104368 A | 11/2016 |
| CN | 107924100 A | 4/2018 |
| CN | 109463008 A | 3/2019 |
| CN | 110612477 | 12/2019 |
| CN | 111739969 A | 10/2020 |
| CN | 112 162 419 A | 1/2021 |
| CN | 113534507 | 10/2021 |
| CN | 113574450 A | 10/2021 |
| CN | 113 655 557 A | 11/2021 |
| CN | 113631998 A | 11/2021 |
| CN | 113677548 A | 11/2021 |
| CN | 113966430 A | 1/2022 |
| CN | 114270249 A | 4/2022 |
| CN | 114609840 | 6/2022 |
| CN | 115145084 A | 10/2022 |
| CN | 115 857 211 A | 3/2023 |
| CN | 106573835 A | 4/2023 |
| CN | 111142306 B | 5/2023 |
| EP | 2 555 049 A2 | 2/2013 |
| EP | 3 381 081 B1 | 4/2021 |
| EP | 4 390 522 A1 | 6/2024 |
| EP | 4 288 833 B1 | 7/2024 |
| FR | 2842916 A1 | 1/2004 |
| JP | S49 29995 A | 3/1974 |
| JP | H8-211422 A | 8/1996 |
| JP | 11021149 A | 1/1999 |
| JP | 2001083538 A | 3/2001 |
| JP | 2004-70163 A | 3/2004 |
| JP | 2005-91442 A | 4/2005 |
| JP | 2005-242320 | 9/2005 |
| JP | 2005265921 A | 9/2005 |
| JP | 2006-195049 A | 7/2006 |
| JP | 2007 017735 A | 1/2007 |
| JP | 2008500592 A | 1/2008 |
| JP | 2008-209953 A | 9/2008 |
| JP | 2009020831 | 1/2009 |
| JP | 2009-80380 A | 4/2009 |
| JP | 2009080288 A | 4/2009 |
| JP | 2011165893 A | 8/2011 |
| JP | 2012-063701 A | 3/2012 |
| JP | 2012203409 A | 10/2012 |
| JP | 2013-7985 A | 1/2013 |
| JP | 2014-35385 A | 2/2014 |
| JP | 2017122846 A | 7/2017 |
| JP | 2002311461 A | 10/2022 |
| KR | 10-2010-0135442 A | 12/2010 |
| KR | 101 067 174 B1 | 9/2011 |
| KR | 20140099421 | 8/2014 |
| KR | 20190050722 A | 5/2019 |
| TW | 201740609 A | 11/2017 |
| TW | 202045998 A | 12/2020 |
| TW | 202219615 A | 5/2022 |
| TW | 202225790 A | 7/2022 |
| TW | 202314334 A | 4/2023 |

(56) References Cited

FOREIGN PATENT DOCUMENTS

| WO | WO 2002/08826 A1 | 6/2002 |
|----|----|----|
| WO | WO 2003/100758 A1 | 12/2003 |
| WO | WO 2004/008423 A1 | 1/2004 |
| WO | WO 2004/012000 A1 | 2/2004 |
| WO | WO2004/086389 A | 10/2004 |
| WO | WO 2008/012934 A1 | 1/2008 |
| WO | WO 2011/012499 A1 | 2/2011 |
| WO | WO 2011/131689 A1 | 10/2011 |
| WO | WO 2014/191233 A1 | 6/2014 |
| WO | WO 2014/209119 A2 | 12/2014 |
| WO | WO 2015/141740 A1 | 9/2015 |
| WO | WO2015136458 A1 | 9/2015 |
| WO | WO 2017/026480 A1 | 2/2017 |
| WO | WO 2017/192881 A1 | 11/2017 |
| WO | WO 2018/204582 A1 | 11/2018 |
| WO | WO 2020/161005 A1 | 8/2020 |
| WO | WO 2021/138344 A1 | 7/2021 |
| WO | WO 2021/228907 A1 | 11/2021 |
| WO | WO 2022/023180 A1 | 2/2022 |
| WO | WO 2022/029018 A | 2/2022 |
| WO | WO 2022/053423 A1 | 3/2022 |
| WO | WO 2022/246430 A1 | 11/2022 |
| WO | WO 2023/117191 A1 | 6/2023 |
| WO | WO 2024/002660 A1 | 1/2024 |
| WO | WO 2024/033009 A1 | 2/2024 |

OTHER PUBLICATIONS

Kotova, S. P. et al., "Technology and electro-optical properties of modal liquid crystal wavefront correctors," *J. Opt. A: Pure Appl. Opt.* 5, 5 (2003) pp. S231-S238.
"An Overview of Metasurface Fabrication," https://planopsim.com/fabrication/an-overview-of-metasurface-fabrication/, accessed Sep. 9, 2022.
Extended European Search Report issued in European Application No. 24205495.5 dated Apr. 28, 2025 (12 pages).
Extended European Search Report issued in European Application No. 24215365.8 dated May 8, 2025 (9 pages).
International Search Report (PCT/ISA/210) and Written Opinion issued in PCT Application No. PCT/EP2025/052112 dated Apr. 28, 2025 (13 pages).
International Search Report (PCT/ISA/210) and Written Opinion issued in PCT Application No. PCT/EP2025/052114 dated Apr. 28, 2025 (13 pages).
Japanese-language Office Action issued in Japanese Application No. 2023-555554 dated March 25, 2025 with English translation (7 pages).
Abdelraouf et al. "Recent Advances in Tunable Metasurfaces: Materials, Design and Applications," ACS Nano, vol. 16, No. 9 (2022) pp. 13339-13369.
Aieta et al. "Supplementary Materials for Multiwavelength Achromatic Metasurfaces by Dispersive Phase Compensation," Science, vol. 347, No. 6228, (2015) pp. 1342-1345.
C. Qiu et al., "Transparent Ferroelectric Crystals with Ultrahigh Piezoelectricity," *Nature*, 577 (2020) pp. 350-367.
California et al. "Silver grid electrodes for faster switching ITO free electrochromic devices," Solar Energy Materials & Solar Cells, vol. 153 (2016), pp. 61-67.
Chen et al. "Flat optics with dispersion-engineered metasurfaces," Nature Reviews Materials, vol. 5 (2020), pp. 604-620.
Chinese Office Action and English Translation from CN 2022800852983, Nov. 15, 2024, 6 pp.
Chinese Search Report and Office Action from Chinese application No. 2022800340665, Jul. 30, 2024, 5 pgs.
Final Office Action from U.S. Appl. No. 17/087,063, dated Jun. 1, 2023, pp. 1-26.
Final Office Action from U.S. Appl. No. 17/383,831, dated Feb. 28, 2023, pp. 1-16.
Office Action from U.S. Appl. No. 17/383,831, dated Oct. 3, 2022, pp. 1-24.

Office Action from U.S. Appl. No. 17/398,239, dated Feb. 28, 2023, pp. 1-26.
Devlin et al. "High efficiency dielectric metasurfaces at visible wavelengths," eprint arXiv:1603.02735 (2016) pp. 1-18.
Extended European Search Report from EP 24177302, Dec. 23, 2024, 19 pp.
Extended European Search Report from European Application No. 22215020.3-1207, May 30, 2023, 9 pp.
Extended European Search Report from European Application No. 24197047.4, Dec. 5, 2024, 22 pp.
Extended European Search Report from European Application No. 24186948.6, Dec. 17, 2024, 8 pp.
Extended European Search Report from European application No. 24166202.2, Oct. 10, 2024, 31 pgs.
Fan, "Freeform Metasurface Design Based on Topology Optimization," MRS Bulletin, vol. 45, (2020), pp. 196-201.
Final Office Action, issued in U.S. Appl. No. 16/834,588, dated Oct. 15, 2020, pp. 1-33, U.S. Patent and Trademark Office, Alexandria, VA.
Hu et al. "Efficient full-path optical calculation of scalar and vector diffraction using the Bluestein method," Light: Science & Applications, vol. 9, issue 119 (2020) pp. 1-11.
International Preliminary Report on Patentability from International Application No. PCT/EP2022/080773, Jan. 3, 2024, 22 pp.
International Preliminary Report on Patentability from PCT/EP2023/065535, Oct. 15, 2024, 15 pp.
International Search Report (PCT/ISA/210) issued in PCT Application No. PCT/EP2023/069486, Oct. 26, 2023, 37 pp.
International Search Report and Written Opinion for PCT/EP2020/052379 mailed Mar. 25, 2020.
International Search Report and Written Opinion from International Application No. PCT/EP2022/080773, May 11, 2023, 30 pp.
International Search Report and Written Opinion from International Application No. PCT/EP2021/071346, Nov. 3, 2021, 15 pp.
International Search Report and Written Opinion from International Application No. PCT/EP2023/065535, Sep. 1, 2023, 15 pp.
International Search Report and Written Opinion from International Application No. PCT/EP2022/056315, Jun. 7, 2022, 15 pp.
Kim et al. "Non-uniform sampling and wide range angular spectrum method," J. Opt. vol. 16 (2014) pp. 125710-1 to 125710-9.
Leutenegger et al. "Fast focfield calculations," Optics Express, vol. 14, No. 23 (2006), pp. 11277-11290.
Li et al. "Large-area metasurface on CMOS-compatible fabrication platform: driving flat optics from lab to fab," Nanophotonics, vol. 9, issue 10 (2020) pp. 3071-3087.
Maniscalco et al., "Thin film thickness measurements using Scanning White Light Interferometry," Thin Solid Films, 550 (2014) pp. 10-16.
Murray et al. "Numerical comparison of grid pattern diffraction effects through measurement and modeling with OptiScan software," Proc. of SPIE, vol. 8016 (2011) pp. 1-15.
Nie et al. Broadband Light Bending with Plasmonic Nanoantennas, Science, vol. 335 (2016), pp. 427-428.
Nockert, "AI for Game Programming 2: Maze Generation (A3.6)," (Jan. 8, 2020) pp. 1-12.
Non-Final Office Action, issued in U.S. Appl. No. 16/778,002, dated Jun. 19, 2020, pp. 1-20, U.S. Patent and Trademark Office, Alexandria, VA.
Non-Final Office Action, issued in U.S. Appl. No. 16/834,588, dated Aug. 3, 2020, pp. 1-43, U.S. Patent and Trademark Office, Alexandria, VA.
Non-Final Office Action, issued in U.S. Appl. No. 16/983,729, dated April 26, 2021, pp. 1-20, U.S. Patent and Trademark Office, Alexandria, VA.
Non-Final Office Action, issued in U.S. Appl. No. 17/087,063, dated Sep. 14, 2022, pp. 1-31, U.S. Patent and Trademark Office, Alexandria, VA.
Notice of Allowance, issued in U.S. Appl. No. 16/778,002, dated Aug. 3, 2020, pp. 1-9, U.S. Patent and Trademark Office, Alexandria, VA.
Notice of Allowance, issued in U.S. Appl. No. 16/834,588, dated Dec. 14, 2020, pp. 1-10, U.S. Patent and Trademark Office, Alexandria, VA.

(56)                    References Cited

OTHER PUBLICATIONS

Notice of Allowance, issued in U.S. Appl. No. 16/944,918, dated May 15, 2021, pp. 1-10, U.S. Patent and Trademark Office, Alexandria, VA.

Notice of Reasons for Refusal and English translation from JP2021-545949, dated Sep. 12, 2023, pp. 1-11.

Office Action issue in Chinese Patent Application No. 202280053722.6 dated Oct. 10, 2024, w/English translation, 10 pages.

Office Action issue in Korean Patent Application No. 10-2024-7024654 dated Sep. 27, 2024, w/Enqlish translation, 15 paqes.

Partial European Search Report from European application No. 23205397.5-1020, Mar. 22, 2024, 16 pp.

Partial European Search Report from European application No. 23217588, Jun. 17, 2024, 10 pp.

Skyum, "A Sweepline Algorithm for Generalized, Delaunay Triangulations," DAIMI Report Series, vol. 20, issue 373 (1991) pp. 1-21.

Tao et al. "Reversible Metal Electrodeposition Devices: Ah Emerging Approach to Effective Light Modulation and Thermal Management," Adv. Optical Mater. vol. 9 (2021) pp. 2001847-1 to 2001847-15.

Toskov et al. "Modeling and fabrication of Pt micro-heaters built on alumina Substrate," Proceedings of the 36th International Spring Seminar on Electronics Technology (2013), pp. 1-7.

Turing, "The Chemical Basis of Morphogenesis," Philosophical Transactions of the Royal Society of London. Series B, Biological Sciences, vol. 237, No. 641 (1952), pp. 37-72.

Yonghe et al. "A Simple Sweep-line Delaunay Triangulation Algorithm," Journal of Algorithms and Optimization, vol. 1, Iss. 1 (2013) pp. 30-38.

Non-Final Office Action dated Mar. 28, 2025, issued in U.S. Appl. No. 18/877,916, 14 pp.

Chinese Office Action and English translation from CN 202380064549.4, Aug. 13, 2025, 17 pgs.

Japanese Notice of Reasons for Rejection and English translation from JP 2024-575753, Jul. 22, 2025, 9 pgs.

English translation of Chinese Office Action from CN 202180063551.0, Jul. 30, 2025, 10 pgs.

International Search Report and Written Opinion from international application No. PCT/EP2025/058134, Jul. 4, 2025, 18 pgs.

Chinese Office Action and translation from CN Appl. No. 202380050094.0, May 24, 2025, 5 pgs.

Japanese Office Action and translation from JP Appl. No. 2023-555554, Jun. 27, 2025, 3 pgs.

Extended European Search Report from EP 25175705, Nov. 13, 2025, 13 pgs.

Ghaemi et al., Surface Plasmons Enhance Optical Transmission Through Subwavelength Holes, Physical Review B, vol. 58, No. 1, 1998, pp. 6779-6782.

Ebbesen et al., Extraordinary Optical Transmission Through Sub-Wavelength Hole Arrays, Nature, vol. 391, 1998, pp. 667-669.

Felzenszwalb et al., Distance Transforms of Sampled Functions, Theory of Computing, vol. 8, 2012, pp. 415-428.

International Search Report and Written Opinion issued in PCT Application No. PCT/EP2024/059853 dated Jun. 13, 2024, 8 pgs.

International Search Report and Written Opinion from International Application No. PCT/EP2024/059851, Jul. 2, 2024, 14 pgs.

Chinese Office Action and English translation from CN 202510163029X, dated Sep. 23, 2025, 12 pgs.

Jones, Liquid Crystal Displays, in: JP. Dakin and R.G.W. Brown, (eds.) *Handbook of Optoelectronics:Enabling Technologies. Series in Optics and Optoelectronics 2*, CRC Press, Boca Raton, FL, 2017, pp. 1-98.

Eames, Vacuum Glazing: Current Performance and Future Prospects, *Vacuum*, 82, 2008, pp. 717-722.

Payami et al., Hybrid Beamforming for Large Antenna Arrays with Phase Shifter Selection, *IEEE Transactions on Wireless Communications*, 15, 11, 2016, pp. 1-20.

Taiwanese Office Action and English translation from TW 111122137, Dec. 29, 2025, 6 pgs.

Japanese Notice of Reasons for Rejection and English Translation from JP 2025-043261, Feb. 3, 2026, 8 pgs.

Japanese Notice of Reasons for Rejection and English Translation from JP 2025-536253, Dec. 24, 2025, 8 pgs.

Taiwanese Office Action and English translation from TW 114119008, Mar. 2, 2026, 24 pgs.

Taiwanese Office Action and English translation TW114129602, Dec. 15, 2025, 25 pgs.

International Search Report and Written Opinion from International Application No. PCT/EP2025/078762, Feb. 6, 2026, 20 pgs.

Chinese Language Office Action and English Translation from CN 202510163029.X, dated Mar. 21, 2025, 20 pgs.

Chinese Language Office Action and English Translation from CN 202480037192.5, dated Mar. 26, 2026, 8 pgs.

Japanese Language Notice of Reasons for Rejection and English Translation from JP2025-559595, dated Feb. 26, 2026, 10 pgs.

* cited by examiner

100

*101*

*102*

_101_

_102_

A

B

C

D

601

602

603

604

GLAZING UNIT WITH OPTICAL MODULATION AND RECEPTION OF RADIO FREQUENCY SIGNAL

RELATED APPLICATIONS

The present patent document is the national stage of International Application No. PCT/EP2023/069486, which was filed on Jul. 13, 2023, and which claims the benefit of priority to EP patent application Ser. No. 22/190,032.7, which was filed on Aug. 11, 2022. The aforementioned applications are hereby incorporated by reference in their entirety.

FIELD

The presently disclosed subject matter relates to a glazing unit and to a substrate.

BACKGROUND

Optically active glazing is known in the art. Typically, an optically active glazing system comprises two parallel plates, made from a transparent dielectric material such as glass or a plastic material. The internal volume defined between the plates may be subdivided into a plurality of small independent volumes or individual cells that are filled with a dielectric fluid. The fluid contains a suspension of particles of a dielectric, charged or chargeable material. The facing sides of the two plates carry electrodes facing each other. The electrodes are connected to an electrical power supply associated with a control means.

The electrodes of each plate are formed by combs that are interleaved into one another in pairs. The electrodes of two interleaved combs are capable of taking up electrical voltages of polarities that are identical or opposite. With a suitable voltage on the electrodes the particles can be concentrated at different locations between the electrodes to give the system either a transparent or an opaque appearance.

A known system for optically active glazing is described in WO 2022/029018 A1, which is included herein by reference.

SUMMARY

It would be advantageous to have improved optically active glazing. In particular, it would be advantageous to have improved optically active glazing units. It would be advantageous to have improved substrates for use in an optical modulator and/or glazing unit, to improve said optical modulator and/or glazing unit.

Existing optically glazing units suffer from various drawbacks. A first one, is that they need power to operate, in particular, to transition from one grayscale level to another. A second one, is that a glazing unit may attenuate RF signals; for example, a wireless signal carrying data may not penetrate through the glazing unit well, so that sending or transmitting wireless signals between the interior of a building employing glazing units and the outside may be difficult. Other issues are discussed in the description. It not needed to address all issues in each embodiment.

Both issues can be addressed by incorporating an antenna in the glazing unit.

For example, a glazing unit may comprise on the one hand an optical modulator, also referred to as a light modulator. For example, the glazing unit may comprise a first and second substrate, with between them an optical layer. Electrodes on the first and second substrate that face the optical layer can manipulate particles in the optical layer to create optical effects, typical changes in transparency. In an embodiment, at least two interdigitated electrodes are used for each substrate; more or fewer is possible though. In an embodiment, the electrophoretic effect is used to manipulate charged particles in the optical layer.

On the other hand, a glazing unit may comprise one or more panes, e.g., of glass. Typically, at least two panes are used, with a thermally isolating layer arranged between them. There are many ways in which the panes and optical modulator may be arranged together. For example, the optical modulator may be arranged inside the two panes of glass or may be arranged outside the two panes of glass. For example, a pane and substrate may be combined to reduce the number of layers in the glazing unit.

Typically, the panes are glass panes. For example, an embodiment may comprise a first glass pane and a second glass pane. A pane may also use a different material, e.g., plastic. We will mostly refer to glass panes, with the understanding that other materials can be used.

Interestingly, in an embodiment, the glazing unit comprises at least one antenna for reception of a radio frequency signal, the antenna being arranged on a side of the first substrate or on a side of the first pane. Such an antenna may be used for different purposes, for example, the antenna may be used for harvesting energy from the received radio frequency signals. The harvested energy may be stored in an energy storage, e.g., a battery or the like. When a transition in the optical state is needed, the stored energy can be used, at least in part, to effect the change.

The antenna may be used to receive RF signals that encode data. For example, the radio frequency signals may be modulated according to a wireless communication standard, e.g., 5G. This is advantages, since the antenna is located near the exterior of the building, and so attenuation is less or absent. The received RF signals may be forwarded to outside the glazing unit, or may be demodulated, e.g., decoded, in the glazing unit. For example, the received information may be forwarded through a wire, e.g., an ethernet system, e.g., an internal routing system, e.g., a local computer network, a LAN or the like. The glazing unit may also act itself on the received information, e.g., the received information may comprise controlling instructions, e.g., instructing the glazing unit to increase or decrease a transparency of the glazing unit.

In an embodiment, the glazing unit may comprise a further antenna arranged near the interior side of the glazing unit. The further antenna may be used to transmit information. The transmitted information may be used the same standard, e.g., 5G or a different wireless standard, e.g., Wi-Fi. A conventional modulation and antenna system may be used for the transmission of data over a wireless signal.

The glass pane may be made of glass, but may be any transparent layer, e.g., made of a transparent material, e.g., plastic, e.g., polyethylene. The substrates may be plastic or glass or other.

In an embodiment, the glazing unit may comprise one or more transparent, conducting layers, e.g., ITO, FTO, nanowire. A transparent, conducting layer may be used to shield an antenna from the optical modulator to reduce interference between the two systems. A transparent, conducting layer may be used as a ground plane to cooperate with an antenna electrode.

Interestingly, the interdigitated electrodes used for optical modulation may also be used as an antenna. For example, a part of the interdigitated electrodes may be used as a patch antenna. The part used as a patch antenna may still carry the low frequency DC signals that are used to control the optical layer. There may be multiple patch antennas made from a single layer of interdigitated electrodes. For example, a low-pass filter may separate a patch from the rest of the interdigitated electrodes. An advantageous way to manufacture a patch antenna, is to use a stepper machine. The stepper repeats a building block for most of the substrate but may use a different block for a part that is also used as an antenna. The different part may for example incorporate a filter connection.

Instead of re-using the interdigitated electrodes, a dedicated antenna may be used. The dedicated antenna may still be situated on the same substrate, e.g., on the first substrate. The dedicated antenna may be elsewhere as well, e.g., on a glass pane.

An aspect of the invention is a substrate according to an embodiment. For example, a substrate may have a first side and a second side, wherein arranged on the first side of the first substrate is an ITO layer, a dielectric layer, and the one or more antenna, and arranged on the second side of the first substrate are at least two interdigitated electrodes. Various other substrates are described herein.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1*a* schematically shows a front view of an example of an embodiment of a glazing unit, FIGS. 1*b*-1*f* schematically show a cross-section of an example of an embodiment of a glazing unit, FIG. 2 schematically shows a cross-section of an example of an embodiment of a glazing unit, FIG. 3 schematically shows an example of an embodiment of a glazing unit, FIG. 4 schematically shows examples of embodiments of an antenna, FIG. 5 schematically shows a front view of an example of an embodiment of a glazing unit, FIGS. 6*a*-6*d* schematically show a cross-section of an example of an embodiment of a glazing unit, FIG. 7*a* schematically show a front-view of an example of an embodiment of a FIGS. 7*b*-7*c* schematically show a front-view of an example of an embodiment of a substrate, FIGS. 8*a*-*f* schematically show a front-view of an example of an embodiment of interdigitated electrodes, FIGS. 9*a*-9*b* schematically show a front-view of an example of an embodiment of interdigitated electrodes, FIG. 10 schematically show an example of an embodiment of a vehicle, FIGS. 11*a*-11*c* schematically show a cross-section of an example of an embodiment of a glazing unit,

LIST OF REFERENCE NUMERALS

Figure 1A:
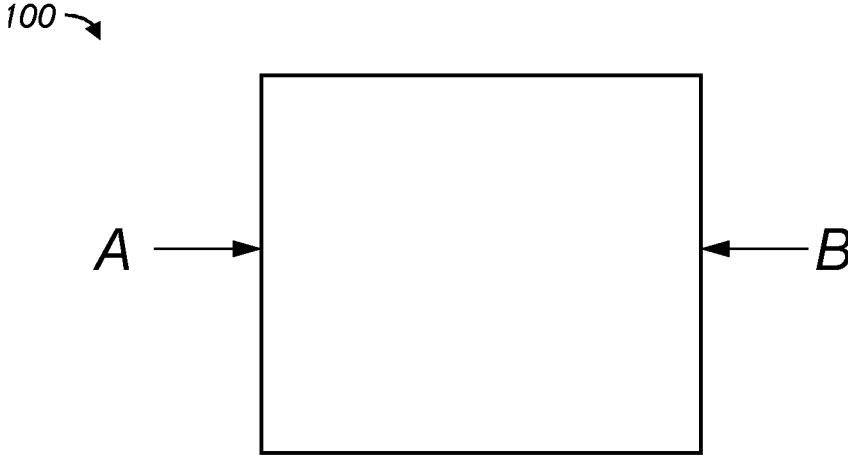

A, B virtual intersection line
100 glazing unit
101 building exterior
102 building interior 111 glass pane
112 glass pane
121 one or more antenna
122 interdigitated electrodes for light modulation
123 interdigitated electrodes for light modulation
124 interior antenna
130 clip
131 projection of clip supporting panes and substrates
141 first substrate
142 second substrate
143 optical layer comprising charged particles for light modulation
144 isolating layer
150 capacitor
151 connection from antenna
152 connection from capacitor to controller
153 connection for driving electrodes 122
154 connection for driving electrodes 123
160 controller
251 dielectric
252 connector
253 ground plane
254 conductive fins
255 non-conductive fins
601 a glazing unit
610 contact for RF signal
630 interdigitated electrodes
631 first part of interdigitated electrodes
632 second part of interdigitated electrodes
633, 643 DC contact for grayscale control
640 interdigitated electrodes
641 first part of interdigitated electrodes
642 second part of interdigitated electrodes
621, 622 substrate
650 glass pane
611 RF ground
651 thermal isolation
653 external side of glazing unit
654 interior side of glazing unit
700-701 a substrate
711-714 a main line
721-724 a main line
731-734 interdigitated electrodes
740 a building block
741-744 a building block
710, 720 a driving bus
719, 729 a connecting zone
760 a connection
791, 792 a direction
10 a light modulator
11 a first substrate
12 a second substrate
13, 13*a*, 13*b* electrodes
14, 14*a*, 14*b* electrodes
15 a fluid
30 particles
20 a car
21 a light modulator

DETAILED DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them. Further, the subject matter that is presently disclosed is not limited to the embodiments only, but also includes every other combination of features described herein or recited in mutually different dependent claims.

Substrates are disclosed, e.g., for use in a light modulator. Substrates as described herein are advantageous as they enable the construction, manufacture, repair, and the like of glazing units as described herein.

Optical light modulation, e.g., as described in the known system in the background is useful in glazing units. The optical properties of a glazing unit, e.g., its transparency, grey level, and the like, may be modulated using electrical control signals. This avoids or reduces the need, e.g., for sunscreens.

Interestingly, an optical modulating glazing unit, also referred to as a smart glazing unit, may comprise multiple electrodes, e.g., as further described herein. It was an insight, that such electrodes may be additionally used for data reception and/or transfer, and/or harvesting energy. Instead or in addition to using the interdigitated electrodes of the optical modulator for these purposes, one or more additional antenna may be added to the glazing unit. The one or more antenna may be configured to one or more of data reception and/or transfer, and/or harvesting energy.

A glazing unit comprising an optical modulator may be further improved with respect to the electric, wireless signals that impinge on it. In a first aspect, wireless signals received at an optical modulating glazing unit are used to charge an energy storage, e.g., a battery. In a second aspect, wireless signals received at an optical modulating glazing unit are received to recover data transmitted in the wireless signals. In a third aspect, wireless signals are transmitted from the optical modulating glazing unit.

A glazing unit is provided configured for reception of radio frequency signals, the glazing unit has an optical layer arranged between a first and second substrate, electrodes on the substrate cooperate in the electrophoretic modulation of the particles' position causing modulation of light passing through the glazing unit. The glazing unit has at least one antenna for reception of a radio frequency signal. The antenna may be arranged on a side of a substrate or on a side of a glass pane.

FIG. 1a schematically shows a front view of an example of an embodiment of a glazing unit 100. Glazing unit 100 is seen in the direction of light passing through the glazing unit from the exterior to the interior, e.g., of a building. The glazing unit typically comprises multiple glass panes, e.g., separated by a thermally isolating layer. The glazing unit typically comprises multiple substrates, e.g., separated by an optically modulated layer.

Each substrate may comprise multiple interdigitated driving electrodes applied to the substrate, each of the multiple driving electrodes being arranged in a pattern across the substrate, the multiple interdigitated driving electrodes being arranged alternatingly with respect to each other on the substrate. The pattern of multiple driving electrodes across the substrate may comprise multiple repeated building blocks. For example, a stepper may apply the building blocks to the substrate in manufacture. A building block may have a side dimension, say from 4 mm to 10 mm, or smaller, or larger. A building block is typically square, but could have other shapes, e.g., rectangular.

For example, the glazing unit shown in FIG. 1a may be integrated in a building. The letters A-B in FIG. 1a show an intersection line, which may be though as the intersection line of FIGS. 1b-1f, and FIG. 2.

FIGS. 1b-1f schematically show a cross-section of an example of an embodiment of a glazing unit. They schematically show a cross-section over the line AB of glazing unit 100 in FIG. 1a.

Figure 1B:
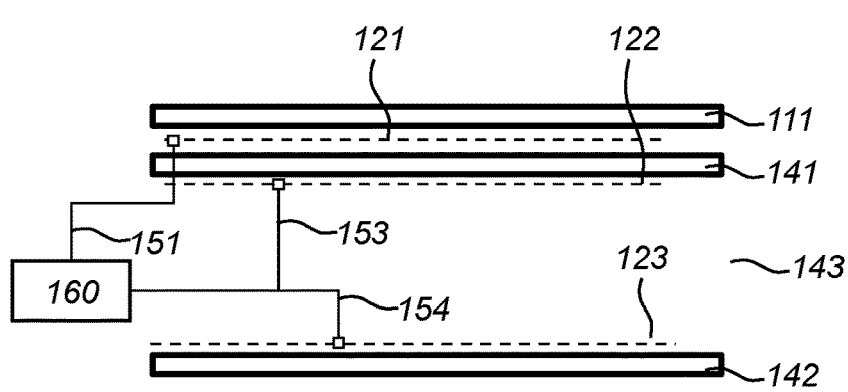
Figure 1B:
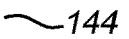
Figure 1B:

FIG. 1b schematically shows a cross-section of an example of an embodiment of a glazing unit. For clarity, the side of the glazing unit that would typically be used on the outside is on the top at reference 101; the side of the glazing unit that would typically be used on the inside is on the bottom at reference 102. For example, 101 may be the exterior of a building, and 102 the interior of a building.

The glazing unit comprises a first glass pane 111 and a second glass pane 112. The first and second glass pane are parallel to each other forming a glazing unit housing. The glazing unit comprises a first substrate 141 and a second substrate 142. The first and second substrate are arranged in the glazing unit parallel to the first and second glass pane; in this case, the first and second substrate are between the first and second glass pane.

The first side of the first substrate is facing first glass pane 111. A second side of the second substrate is facing the second glass pane 112. In this example, the first and second substrate are arranged inside the glazing unit between the two glass panes.

The first and second substrates form an optical modulator, also referred to as a light modulator. In an electrophoretic optical modulator, e.g., the electrophoretic force is used to move charged particles. Typically, at least two interdigitated electrodes are arranged on a second side of the first substrate, the second side of the first substrate being opposite the first side of the first substrate, the second side of the first substrate facing a first side of the second substrate. At least two interdigitated electrodes are arranged on the first side of the second substrate, the first side of the second substrate facing the first substrate. An optical layer 143 is arranged between the first and second substrate, charged or chargeable particles being in fluidic suspension in the optical layer. The particles and electrodes on the first and second substrate are configured to cooperate in electrophoretic modulation of the particles' position causing modulation of light passing through the glazing unit.

For example, the known system describes how such an optical modulator might work. An example is also provided with reference to FIGS. 11a-11c, discussed below.

The glazing unit comprises at least one antenna 121 for reception of a radio frequency signal, the antenna being arranged on a side of the first substrate or on a side of the first glass pane. In this example, an antenna 121 is arranged on the external side of glass pane 111. The glass panels may or may not be coated. For example, in an embodiment glass panel 111 may be uncoated, while glass panel 112 may be coated.

In this example, the glazing unit is an isolating glazing unit comprising at least two glass panes. Between the two glass panes an isolating layer 144 is arranged. In this example, the isolating layer 144 is between second substrate 142 and second pane 112. The isolating layer 144 could be a vacuum or may comprise an isolating gas, e.g., argon. The glazing unit may have more than one thermally isolating layers, and may have more than 2 glass panes.

The glazing unit may comprise a controller 160 connected to the at least two interdigitated electrodes on the first substrate and/or to the at least two interdigitated electrodes on the second substrate for controlling the optical layer. Controller 160 may be configured to receive a control signal instructing the optical layer control. For example, controller 160 may receive an instruction from outside the glazing unit to increase or decrease the transparency of the glazing unit. In response thereto, controller 160 may arrange the particles in the optical layer to follow the instruction. For example, controlling signals to the interdigitated electrodes, may comprise an opposite, or out of phase DC signal on some pairs of electrodes, whereas other pairs of electrodes may receive the same signal, or an in-phase signal. The phase and the selected electrodes in part determine the optical effect.

Controller 160 is not necessary. For example, instead of performing control in the glazing unit, the glazing unit may directly receive controlling signals from outside the glazing unit, e.g., from an external controller.

The glazing unit comprises an antenna 121 to interact with RF signals, e.g., wireless electric signals, e.g., antenna signals, e.g., radio frequency signals. The number and type of antenna depends, e.g., on the type of interaction. The antenna may be an additional electrode(s), but may also re-use the interdigitated electrodes for a further purpose.

For example, in an embodiment, the at least one antenna may comprise a first antenna configured to capture electric power from the received radio frequency signal. For example, the received signal may be down converted, e.g., to DC and used to charge an energy storage, e.g., a capacitor, a battery, etc. (not separately shown).

For example, controller 160, if present, may be arranged to obtain electrical power from the antenna signal for driving, at least in part, the interdigitated electrodes 122, 123 on the first and second substrates 141, 142. This has the advantage that increasing or decreasing the transparency of the glazing unit needs no or less external power. This is an example of a first antenna.

The antenna 121 may be configured to recover RF modulated data from the received radio frequency signal, e.g., a second antenna. The second antenna may be on the exterior side of the first glass pane.

The glazing unit may comprise an antenna for configured to re-transmit the recovered RF modulated data after re-modulation, e.g., a third antenna. For example, data obtained from an exterior antenna, may be retransmitted on an interior side. This third antenna type is not shown in FIG. 1*b*.

A combination of the second and third antenna has the advantage that radio frequency signals, e.g., antenna signals that do not easily penetrate a glazing unit, e.g., due to coating and the like, can still be received on the inside of the building. Likewise, a receiving antenna on the interior aide, and a transmitting antenna on the exterior side would facilitate a transmitting device on the inside, e.g., inside a building to transmit to the outside, e.g., to the exterior of the building. For example, smart phone reception in a building with glazing units according to an embodiment, and/or smart phone transmission in a building with glazing units according to an embodiment, may be improved.

For example, the glazing unit may comprise a radio frequency demodulator, and/or a radio frequency modulator; e.g., controller 160 may be so configured, or additional circuitry may be added to the glazing unit. Frequency modulation and demodulation are not both are needed. For example, a received signal may be forwarded over a wired connection. A signal received over a wire may be forwarded over an antenna. The antenna signals may comprise 5g signals. Transmitted signals on the interior side, may be Wi-Fi signals. For example, received 5G data may be forwarded as Wi-Fi data.

Interestingly, the frequency of RF antenna signals and the frequency of DC signals used for controlling interdigitated electrodes in the optical modulator part is quite different. For example, the interdigitated electrodes on the first and second substrate may be controlled with an electric signal with a frequency below 1k Hz, preferably below 100 Hz, whereas the antenna signal may be above 100 MHZ, or even 1 GHZ. This difference allows re-use of all or part of the interdigitated electrodes as will be further discussed herein as well.

The antenna 121 may comprise one or more patch elements configured as patch antenna. Antenna 121 may be connected with or through a capacitor for tuning of the antenna. Shown in FIG. 1*b*, from the outside 101 of the building to the inside 102 of the building, there is shown:

a glass pane 111; one or more antenna 121 for reception of exterior antenna signal; first substrate 141; interdigitated electrodes 122 for light modulation; optical layer 143 comprising charged particles for light modulation; interdigitated electrodes 123 for light modulation; second substrate 142; an isolating layer 144; and a glass pane 112.

The glass pane may be of glass, the substrate may be of polyethylene, but this is not necessary. Both panes and substrate may be plastics, or both may be glass, or as is desired. Preferably, the substrates are dielectric, and glass, and substrates are both transparent. Preferably transparent electrodes are used as well. Instead of transparent, translucent materials may be used.

Shown in FIG. 1*b* is also a controller 160, connected to antenna 121 and interdigitated electrodes 122 and 123. An interior antenna is not shown, and is also not necessary, depending on the embodiment.

FIGS. 1*c*-1*f* are similar and are discussed briefly below.

Figure 1C:
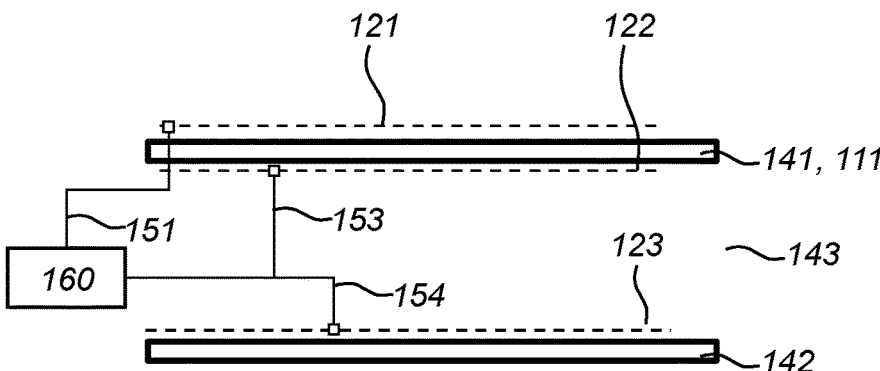
Figure 1C:
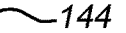
Figure 1C:

FIG. 1*c* schematically shows a cross-section of an example of an embodiment of a glazing unit. In FIG. 1*c*, glass pane 111 and substrate 141 are combined. For example, either one of a glass pane or substrate may be used. Electrodes and/or antenna may be applied to the sides of the glass pane or to the substrate as desired. For example, a glass pane and substrate may be combined, e.g., glued together. An advantage of the arrangement in FIG. 1*c* is the fewer layers are needed and that antenna 121 is on the outside of the glazing unit, for improved reception. A protective coating may be applied on electrodes, in particular onto antenna 121, and/or onto the interdigitated electrodes.

Figure 1D:
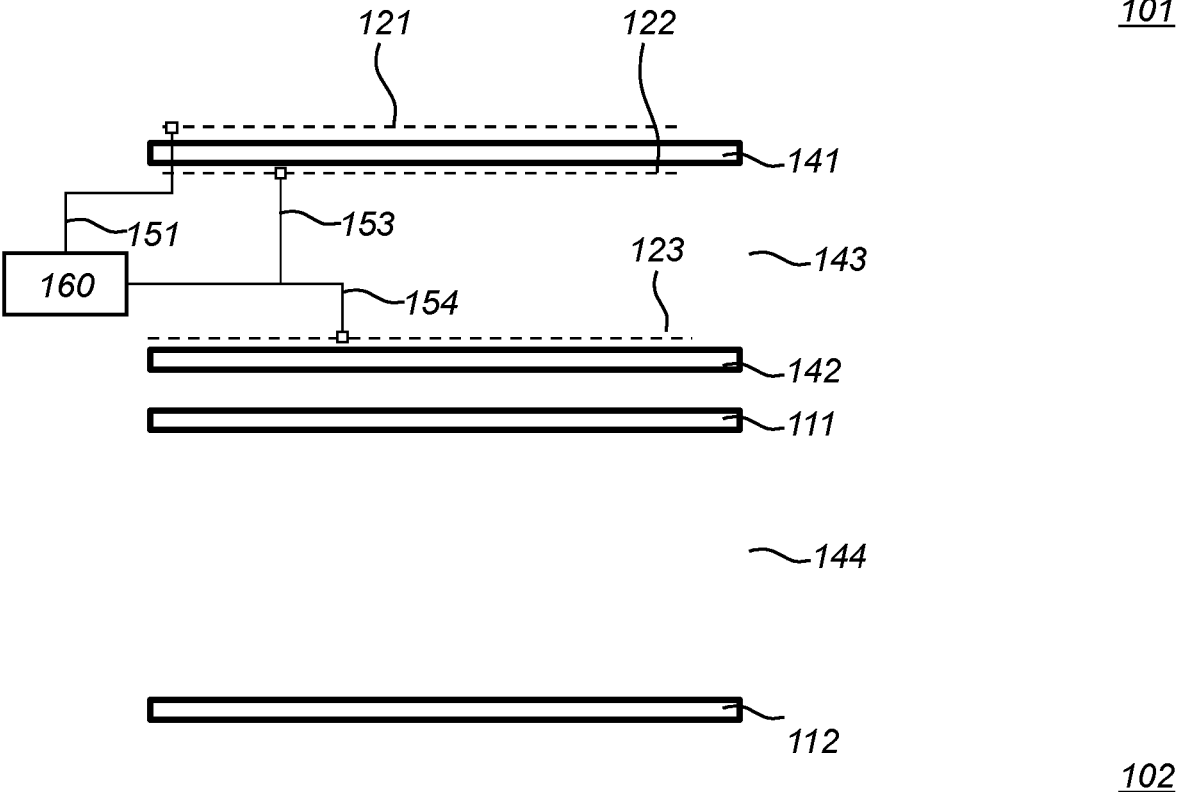

FIG. 1*d* schematically shows a cross-section of an example of an embodiment of a glazing unit. In this variant, the optical modulator is arranged, not between the glass panes, but outside the glass panes.

Shown in FIG. 1*b*, from the outside 101 of the building to the inside 102 of the building, there is shown:

one or more antenna 121 for reception of exterior antenna signal; first substrate 141; interdigitated electrodes 122 for light modulation; optical layer 143 comprising charged particles for light modulation; interdigitated electrodes 123 for light modulation; second substrate 142; a glass pane 111; an isolating layer 144; and a glass pane 112. Layers 142 and 111 could be combined as in FIG. 1*c*.

An advantage of this arrangement is that antenna 121 is also outside the glass pane.

Figure 1E:
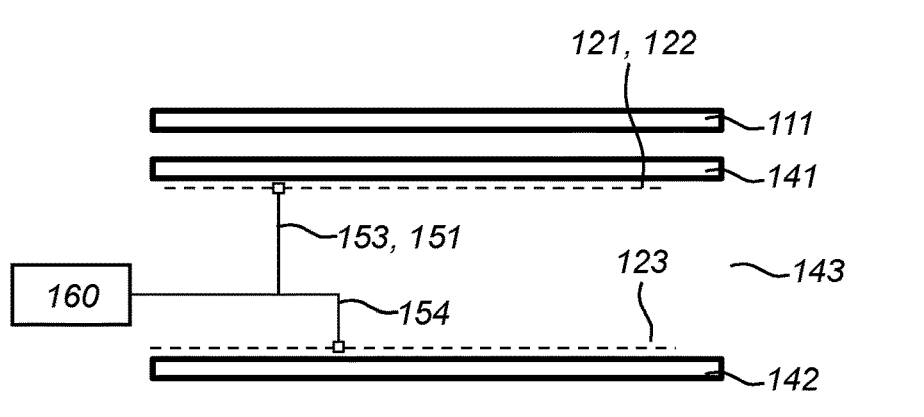
Figure 1E:
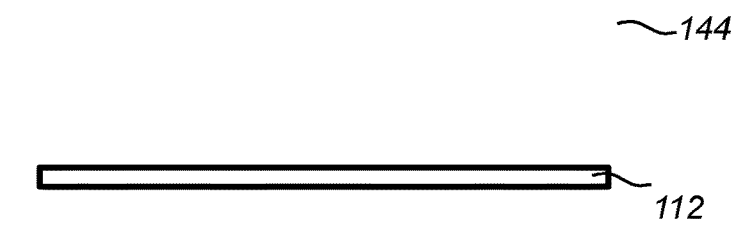
Figure 1E:
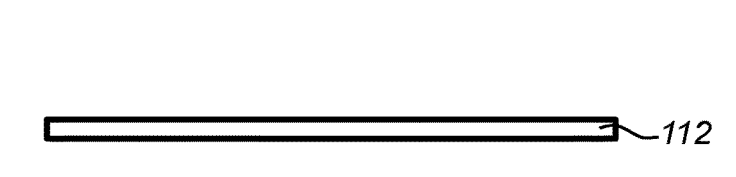

FIG. 1*e* schematically shows a cross-section of an example of an embodiment of a glazing unit. This embodiment combined the interdigitated electrodes 122 with the antenna 121. For example, all or part of the interdigitated electrodes may be used as antenna 121. The remainder of the interdigitated electrodes may be used for optical modulation. For example, a low-pass or high-pass filter may be used to separate the signals. If only a part of the interdigitated electrodes are used for antenna 121, they may be connected to a DC passing, RF blocking connection, e.g., an inductor. For example, the cutoff may be set at above 1 KHz, 1 Mhz, 1 GHZ, or the like.

Figure 1F:
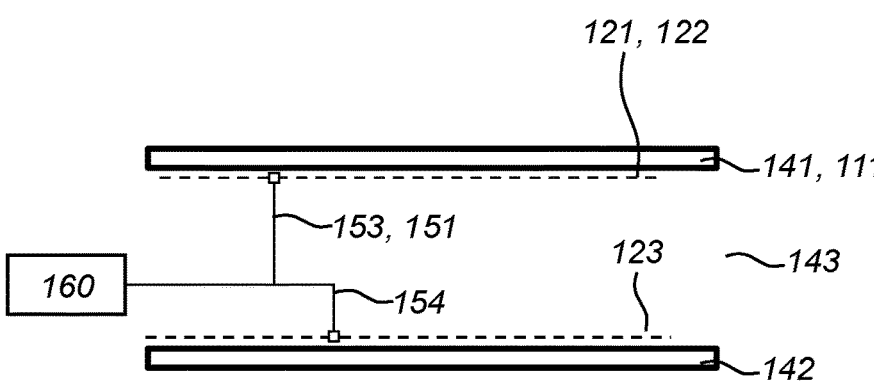

FIG. 1f schematically shows a cross-section of an example of an embodiment of a glazing unit. In FIG. 1f, layers 111 and 141 may be combined.

A ground plane for the antenna may be added as needed in these examples, e.g., the examples of FIGS. 1b-1f. A ground plane may be added, e.g., at a side of a substrate, glass pane, or the like. Alternatively, the interdigitated electrodes on the second substrate may be used as a ground plane. Preferably, the ground plane is opposite the antenna.

A ground plane may be executed, e.g., as conducting, transparent layer, e.g., ITO, or FTO, or any other transparent electrode, e.g., nanowire (like silver). The ground plane may be on the glass. A ground plane is sometimes referred to as a ground electrode.

Embodiments can be varied in many ways. For example, in an embodiment, shielding layers may be added.

For example, in an embodiment, as seen from the outside of the building the following layers may be present: a first glass pane; one or more antenna; full dielectric layer; full ITO layer; a first substrate; a first modulator electrode pattern; an optical layer; a second modulator electrode pattern; a second substrate. In this example, the antenna, e.g., antenna 121 is shielded from the interdigitated electrodes. This has the benefit of reducing interference between the antenna and interdigitated electrodes.

For example, in an embodiment, as seen from the outside of the building the following layers may be present: antenna electrodes; dielectric layer; a full ITO in the exterior side of the glass pane; a glass pane acting as a full dielectric layer; first dielectric substrate; a first modulator electrode pattern; an optical layer; a second modulator electrode pattern; a second substrate. First glass pane and substrate may be combined into one layer.

For example, in an embodiment, as seen from the outside of the building the following layers may be present: antenna electrodes; first glass pane acting as a full dielectric layer; a full ITO on the side of the glass pane facing the first substrate; first substrate; first modulator electrode pattern; an optical layer; Second modulator electrode pattern; second substrate.

For example, in an embodiment, as seen from the outside of the building the following layers may be present a glass pane; a first substrate; a first modulator electrode pattern embedded therein are antenna patches; an optical layer; a second modulator electrode pattern; a second substrate.

The antenna patches may comprise additional antenna electrodes, possibly isolated from the interdigitated electrodes. The antenna patches may be part of the interdigitated electrodes. Note that since the interdigitated electrodes are close to each other, they can act as an antenna patch.

A ground plane can be inserted as any suitable point, or one of the sets of interdigitated electrodes may be used as a ground plane. A ground plane may be a transparent and conductive layer, e.g., ITO, FTO, nanowire, etc.

The ITO layer may be a full ITO layer, e.g., on the side of the glass substrate where the electrodes are. The antenna electrodes are then better insulated from the electrodes used for the modulator. The substrate may be coated with full ITO, then with a dielectric everywhere, then the optical modulator electrode pattern. The dielectric layers do not need to be full dielectric layers; for example, the dielectric layer may only isolate the antenna from the ITO. Generally speaking, Instead of ITO, another conducting transparent layer may be used, e.g., FTO. Similarly, the ITO layer can be used on the other side of the glass substrate and then use the glass substrate as a dielectric.

One may add or filter out a high frequency signal on top of the low frequency one used for light modulation without troubling the light modulation.

The antenna may be an antenna array. Antenna and earth plane may be embedded in the interdigitated electrodes. For example, the interdigitated electrodes may conveniently be manufactured with a stepper. The stepper may use a different tile for the antenna, and/or different connections.

The signals that arrive at the antenna will be at modulated frequencies. In the case of embedded MIMO Tx/Rx antennas the frequencies may be slightly different but all within the same bandwidth, e.g., the GHz range. Each sub carrier may be steered with a beamforming algorithm.

For the internal Tx/Rx the signals arriving at the patch antennas would be at a similar frequency and the antenna beams may be fixed.

The optical modulator is controlled by DC signals of comparatively low frequency. Thus, a patch antenna and/or an RF ground could be isolated from the optical modulator.

One option for the RF ground is a continuous ITO plane that laid down on the interior face of the glazing pane. An alternative is to use the second interdigitated electrodes layer as the RF ground plane. For example, one may apply a DC/low frequency AC to the electrodes for modulating the light and use the resulting average DC as the RF reference for the antenna. The RF reference may be obtained by feeding the light modulator control signal through a band pass filter.

For example, as the examples show, a glazing unit may comprise from the exterior of the first glass pane: the one or more antenna, a dielectric layer, an ITO layer, and the first substrate, in that order, the dielectric layer isolating the one or more antenna from the ITO layer. Added to these may be second substrate, second glass pane, and so on. The coatings may be applied to glass pane or substrate.

For example, in an embodiment arranged on the first side of the first substrate is an ITO layer, a dielectric layer, and the one or more antenna.

For example, in an embodiment arranged on a side of the first glass pane facing away from the first substrate is an ITO layer, a dielectric layer, and the one or more antenna.

For example, in an embodiment arranged on a side of the first glass pane facing away from the first substrate are the one or more antenna and arranged on the first side of the first substrate is an ITO layer.

Figure 2:
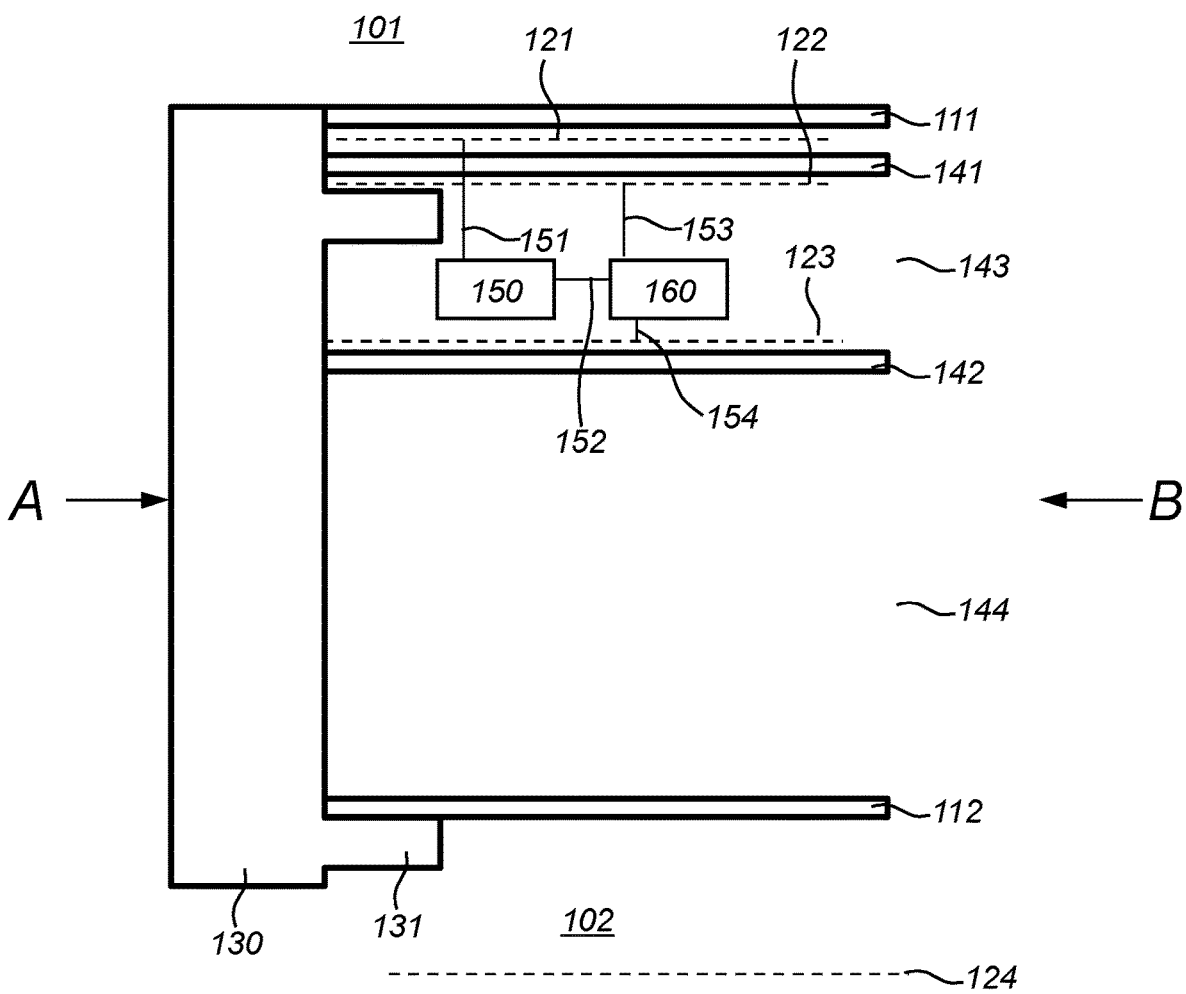

FIG. 2 schematically shows a cross-section of an example of an embodiment of a glazing unit. This glazing unit is similar to the arrangement shown in FIG. 1b, but FIG. 2 shows additional detail. Similar embodiment may be constructed from the arrangements shown in FIGS. 1c-1f.

Shown in FIG. 2 is a clip 130. Clip 130 surrounds the glazing unit, and serves as a frame on which the panes and/or substrate may be arranged. For example, clip 130 may have projections, e.g., projection 131, to support a pane and/or substrate. Clip 130 may be made, e.g., of stainless steel, aluminum, or another metal. Other materials are possible as well for clip 130.

For example, clip 130 may surround the glazing unit, the first and second glass pane may be attached to the clip thus forming the glazing unit housing. The clip may be arranged to space the first and second glass pane from each other. Separating the first and second substrate may be done with separators or spacers arranged in the optical layer. Further sealant layers around the glazing unit, further spacers etc., may be present.

A capacitor 150 is shown in FIG. 2, e.g., to tune antenna 121, e.g., to tune it to 5g or the like. A capacitor may be omitted if tuning is not needed, or achieved in another way. A capacitor may be added to the glazing units of FIGS. 1b-1f as needed.

Shown in FIG. 2 is an optional third antenna 124 configured to re-transmit the recovered RF modulated data after re-modulation.

Figure 3:
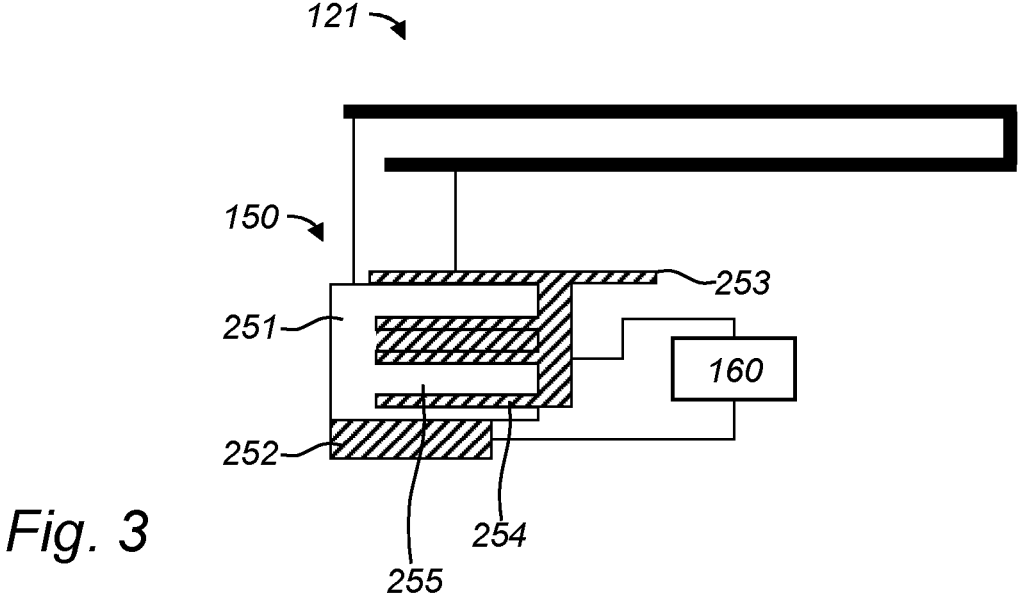

FIG. 3 schematically shows an example of an embodiment of a glazing unit. Note that antenna 121 is schematically drawn in a front view, but capacitor 150 in a cross view. The antenna 121 may be configured to recover RF modulated data from the received radio frequency signal. The antenna 121 may be configured to harvest energy from the received radio frequency signal.

In this example, capacitor 150 comprises multiple interdigitated dielectric fins 255 and conducting fins 254. A ground plane 253 is connected to a first outer dielectric fin and a connector 252 to a second outer dielectric fin. A first connection of antenna 121 is connected to the first outer dielectric fin and a second connection of antenna 121 is connected to the connector 252.

Figure 4:
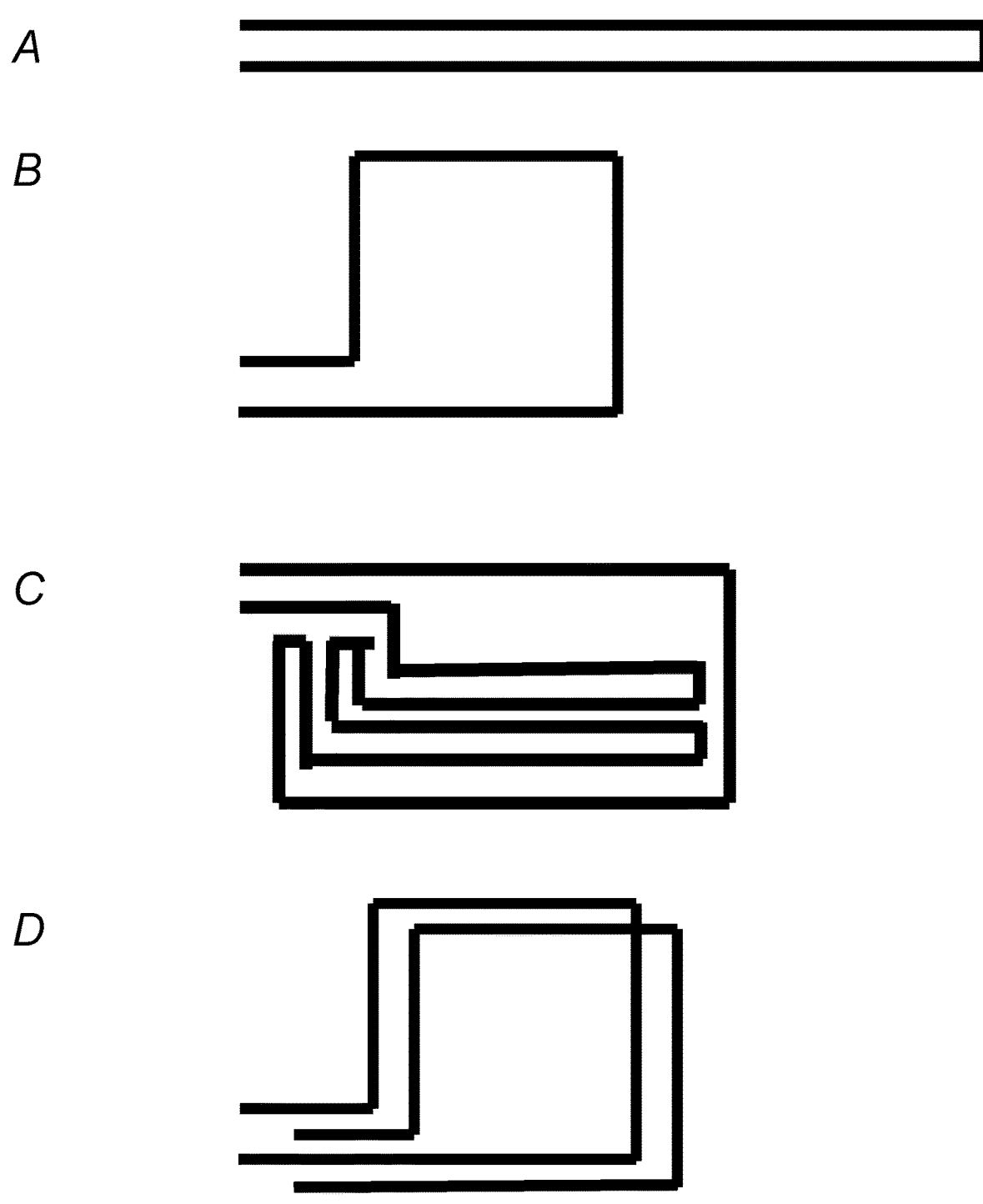

FIG. 4 schematically shows examples of embodiments of an antenna. These antenna designs are for example useful for energy harvesting. For example, they may be used as a first antenna configured to capture electric power from the received radio frequency signal. For example, they may be used as antenna 121.

For example, one may use these antennas for RF energy capture. The captured signal may be down converted to DC and used to charge an energy storage system with it, e.g., a battery (not separately shown). These antennas may be isolated from the optical electrodes. Advantageously, the antenna designs of FIG. 4 are not seen by a user, as they run around the outside of the glazing unit.

Antenna design A may be arranged along one edge of the glass pane, e.g., first glass pane 111. Antenna design B may be arranged around all edges of the glass pane. Designs C may be arranged around an edge, or around two edges, etc. These designs may use multiple loops, e.g., as shown in antenna D. Antenna D has two loops to increase the amount of energy harvested.

Figure 5:
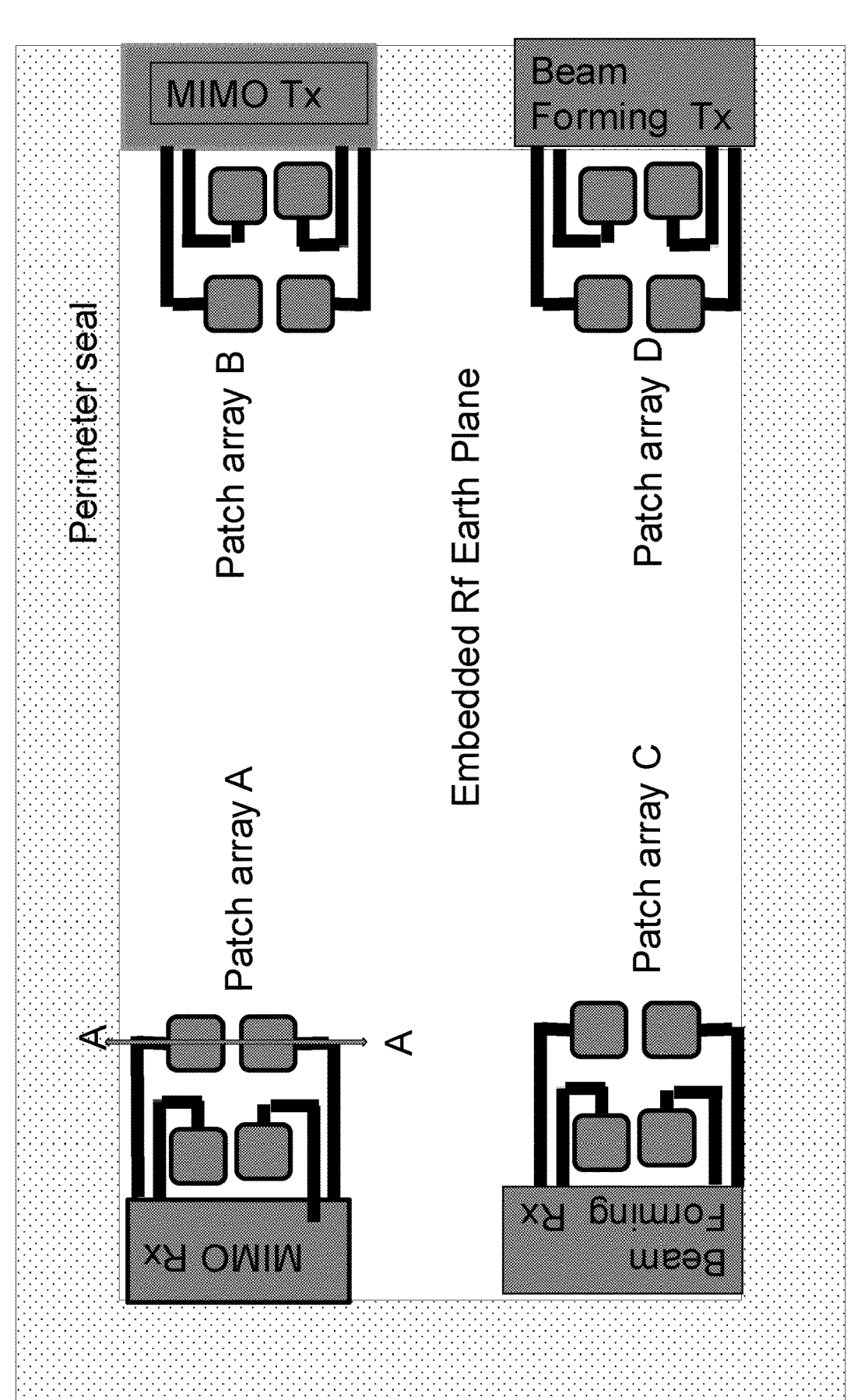

FIG. 5 schematically shows a front view of an example of an embodiment of a glazing unit 600. The view shown in FIG. 5 is from the exterior looking into the glazing unit. Note that not all elements shown in FIG. 5 are at the same level.

Show in FIG. 5 is a patch antenna array A, which is a MIMO Rx array, and a patch antenna array B, which is a MIMO Tx array. Antenna arrays A and B are arranged at the exterior side of a glass pane in this example; this reduces the attenuation of radio frequency signals, e.g., antenna signals, in patch arrays A and B.

Also shown in FIG. 5 is a patch antenna array C, which is a Beam forming Rx, and a patch antenna array D, which is a Beam Forming Tx. The latter two arrays are arranged at an interior side of a glass pane of the glazing unit, in this example; this reduces attenuation of antenna signals sent and received from the inside, e.g., of a building.

FIG. 5 further shows an embedded RF earth plane, for cooperating with the patch antenna arrays.

The four patch antenna arrays may be controlled by MIMO and/or beam forming. Note that the patches have separate feeds. The length of the feeds is arranged so that they have an equal length and have a resistance of 50 Ohms. The size of the antenna patches may depend on the frequency that they are using. The antenna signal and data is shared across the four patches. In case of the beam forming, the frequency is the same but phase and amplitudes may be different. The number of patches may be more or less. The dimensions of the patches and feeds may be varied, e.g., optimized in an antenna simulation program.

Figure 10:
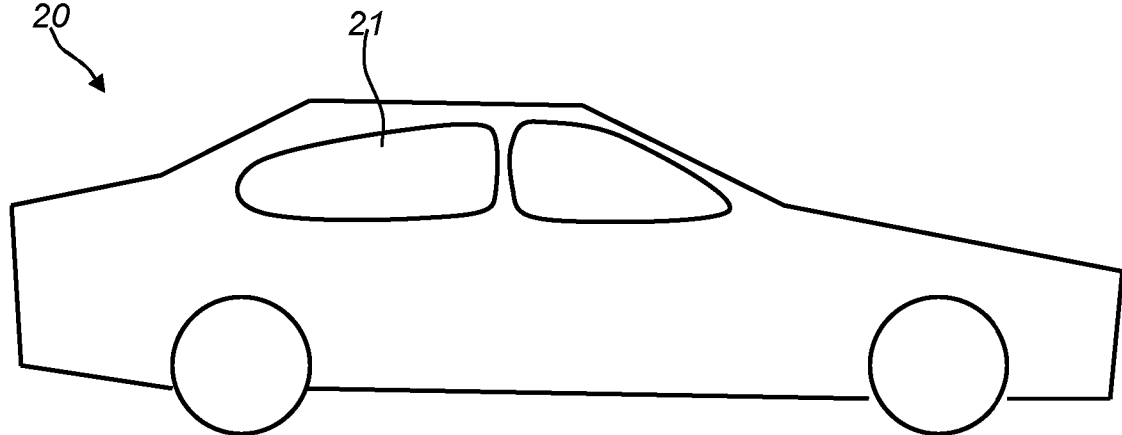

Various antenna designs, e.g., suitable for 5G communication, and how to design them are described in the paper '5G MIMO Conformal Microstrip Antenna Design' by Qian Want et al. DOI: 10.1155/2017/7616825. The paper is included herein by reference. For example, FIG. 1 shows a model of rectangular microstrip patch antenna. FIGS. 6, 10 and 14 show examples of an array. Although a patch antenna may be implemented with a monolithic patch of, say, metal, this is not necessary. Interestingly, a patch antenna may be implemented with closely spaced line electrodes. For example, the same pattern of electrodes used for optical modulation, with low-frequency DC signals, may be used as a patch antenna when used with high-frequency RF signals.

For example, the interdigitated electrodes may have a width of say in the range of 10-100 micrometer, and the width between them, the line gap, may be in the same range. For example, a minimum line gap between electrodes may be, say 20 μm, with an average line gap, of say of 50 μm.

FIG. 5 shows a line A-A, which is an intersection line. FIGS. 6a-6d schematically show a cross-section of an example of an embodiment of a glazing unit.

Figure 6A:
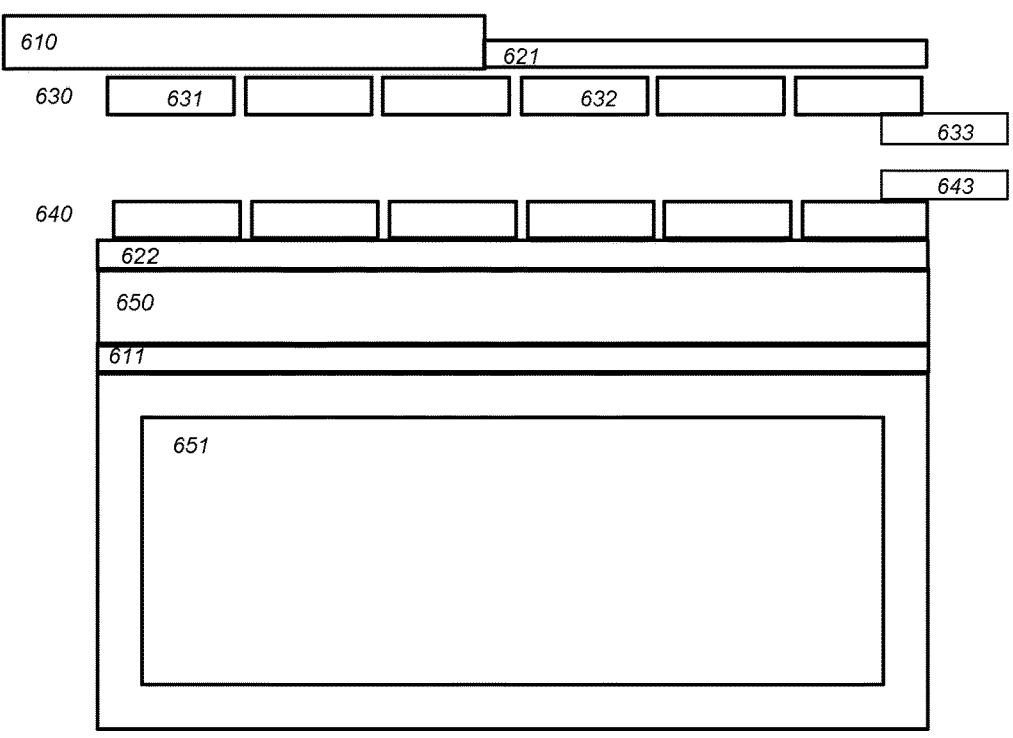

FIG. 6a schematically show a cross-section of an example of an embodiment of a glazing unit 601. Note that the intersection only extends though patch array A, however, the intersection may be extended similarly for patch array C.

Shown in FIG. 6a is a glazing unit 601 configured for reception of antenna signals. In particular, glazing unit 601 may be used for 5G signals. Other wireless RF telecommunication standards may similarly be used.

Glazing unit 601 comprises a first substrate 621 and a second substrate 622. The exterior side of the glazing unit is indicated at 653, the interior side at 654. At least two interdigitated electrodes 630 are arranged on a second side of the first substrate 621. At least two interdigitated electrodes 640 are arranged on the first side of the second substrate 622. Between substrates 630 and 640 is an optical layer. Charged particles in the optical layer may be modulated, e.g., moved, by electric field generated by applying DC signals to the interdigitated electrodes. Shown in FIG. 6a are DC contacts 633 and 643 for connecting the interdigitated electrodes to control signals. Spacers may be included in the optical layers for keeping the two substrate at the correct distance, e.g., a constant distance.

Glazing unit 601 comprises a first glass pane 650. Adjacent to the glass pane is a thermally isolating layer 651, e.g., a vacuum, a space filled with argon gas, etc. Below the isolating layer 651 there may be a second glass pane, and below that patch array C. The latter two are not shown in FIG. 6a.

An RF ground plane 611 is inserted between glass pane 650 and the isolating layer 651. For example, ground plane 611 may be a full ITO layer. If desired a further RF ground plane may be inserted between isolating layer 651 and the second glass pane. The further RF ground plane may be used for patch array C.

The interdigitated electrodes 630 on the first substrate are portioned into two groups: electrodes 631 and electrodes 632. Both sets contain at least two electrodes, which are interdigitated to allow optical control of the optical layer. Electrodes 631 are connected to an RF contact 610. RF contact 610 may be, e.g., a lead shown in FIG. 5. Electrodes 631 may be a patch shown in FIG. 5. Electrodes 631 and 632 are connected but through a connect that only allows low frequency signals to pass, e.g., an inductor. As a result, the DC control signals received at contact 633 can also modulate the optical layer underneath electrodes 631. However, the low-pass, high-block, connections allows the size of the patch antenna to be tuned to a particular frequency, e.g., to 5G.

In an embodiment, Rf contact 610 makes electrical contact with a patch of optical electrodes. The patch contains interdigitated electrodes. The patch is isolated, from a RF point of view from the rest of the optical electrodes, the patch is connected through an inductor with the rest of the optical interdigitated electrodes. The RF ground plane could be smaller. E.g. only below an antenna patch. A bit larger is preferable to avoid edge problems.

Figure 6B:
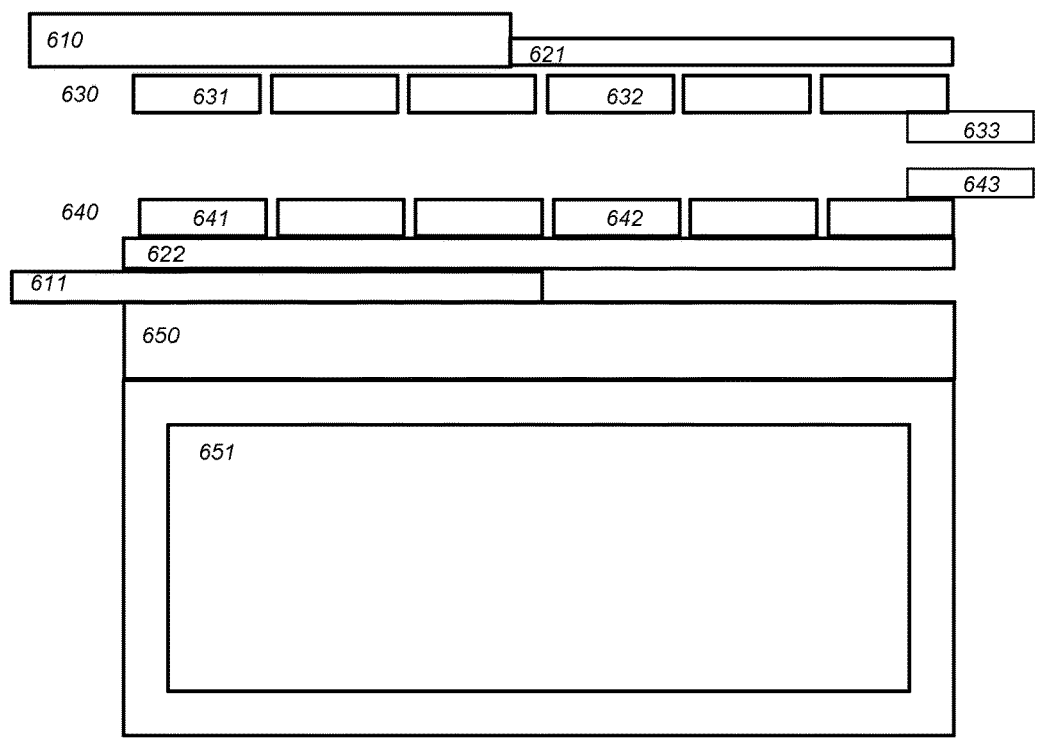

FIG. 6b schematically show a cross-section of an example of an embodiment of a glazing unit. FIG. 6b is similar to FIG. 6a except that the position of the RF ground plane moved to between the substrate 622 and glass pane 650. Also, the RF ground plane is smaller, to cover only the patch antenna part of the interdigitated electrodes.

Figure 6C:
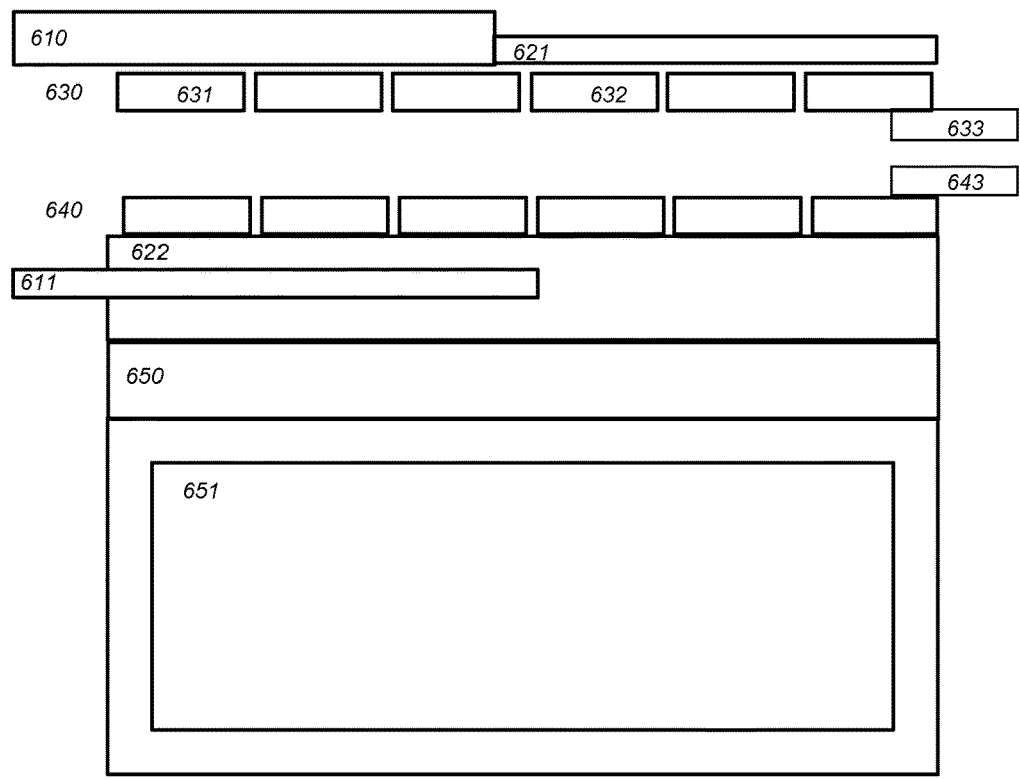

FIG. 6c schematically show a cross-section of an example of an embodiment of a glazing unit. FIG. 6c is similar to FIG. 6b except that the position of the RF ground plane moved to in-between substrate 622. For example, the RF ground plane is integrated in the substrate.

Figure 6D:
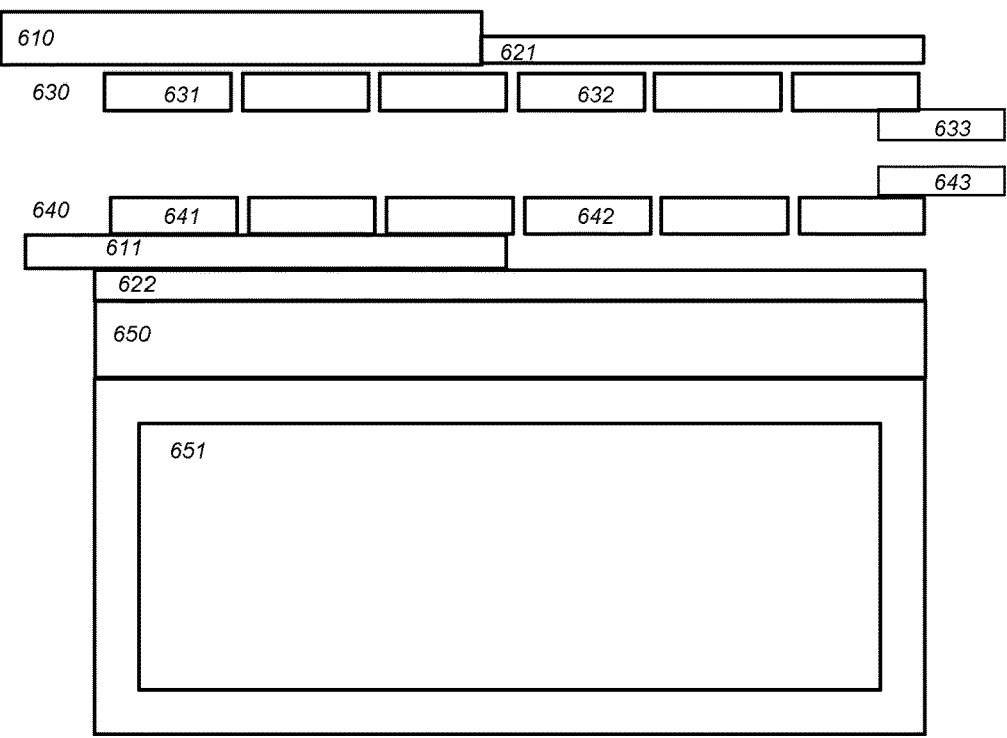

FIG. 6d schematically show a cross-section of an example of an embodiment of a glazing unit. In this variant, the ground plane made up of part of the interdigitated electrodes. The electrodes are connected with an RF ground plane contact, e.g., through a high-pass, low-block, filter. In this case, the electrodes 640 may be portioned into two groups: electrodes 641 and electrodes 642. The two groups may be connected with a connection that allows low frequency signals (DC signals) to pass, but block high frequency.

Alternatively, the entire set of interdigitated electrodes on the second substrate may be used as an RF ground plane. For example, a high-pass filter may be used at a RF ground plane connection, while a low-pass filter may be used at 643. Other architectures are possible.

Figure 7A:
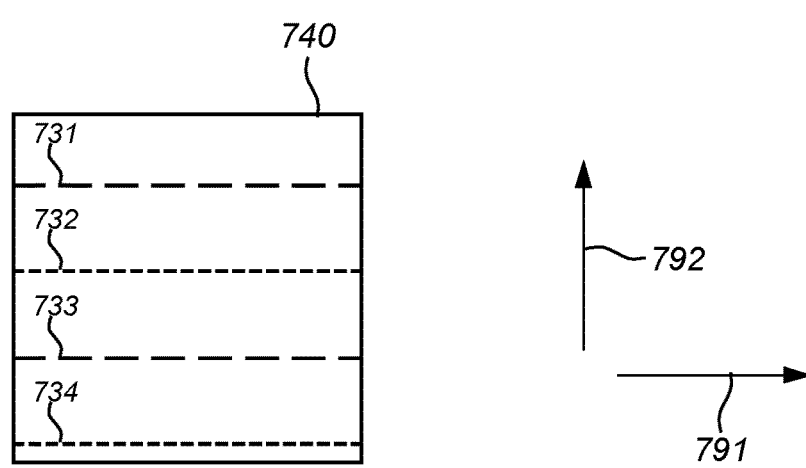
Figure 7B:
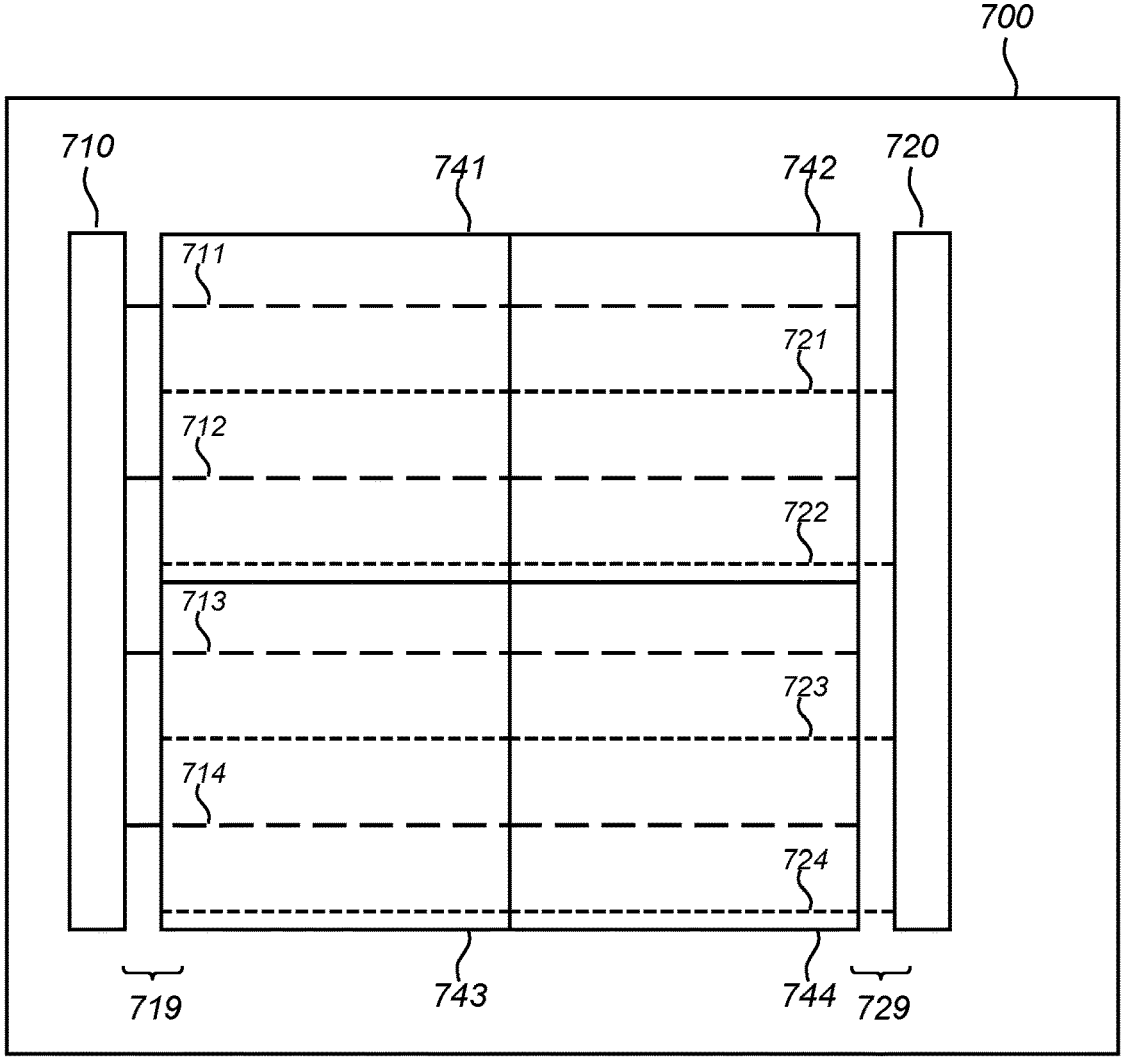
Figure 7C:
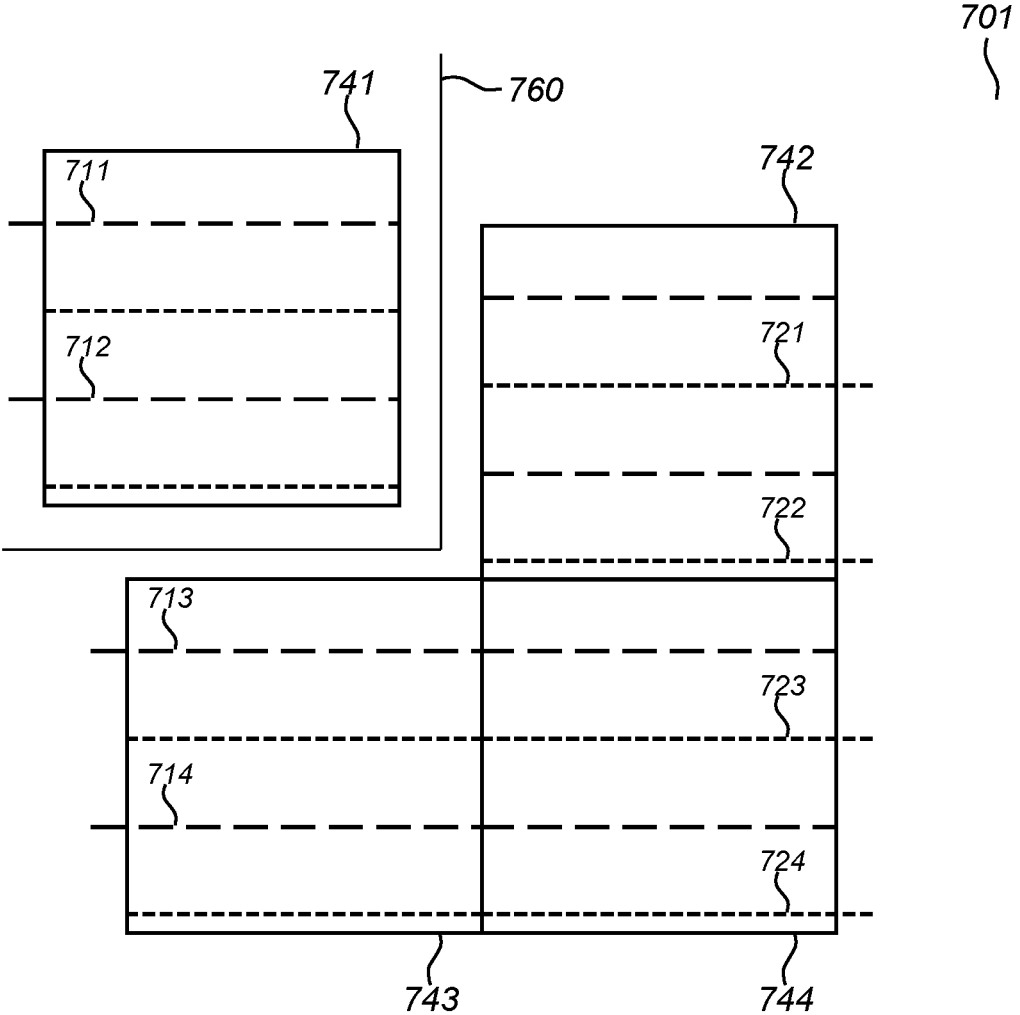
Figure 8A:
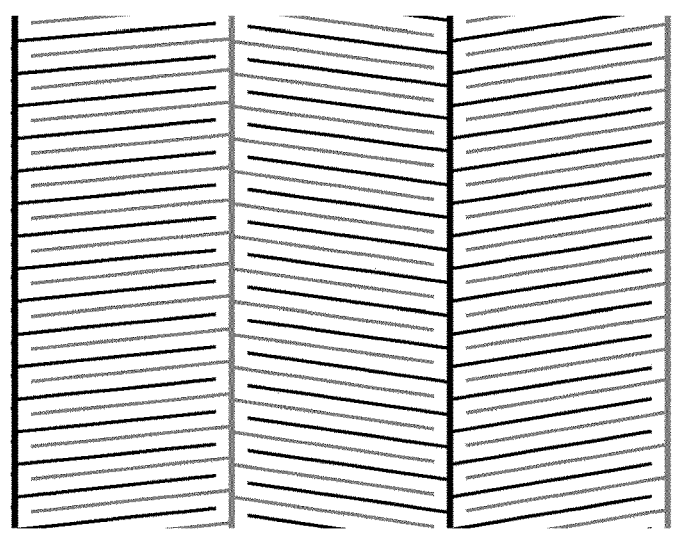
Figure 8B:
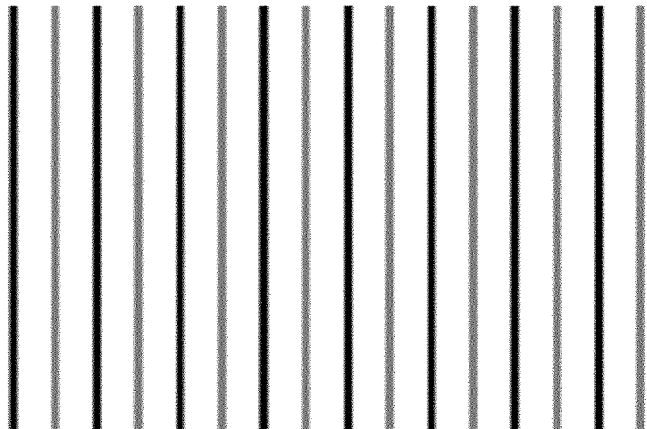
Figure 8C:
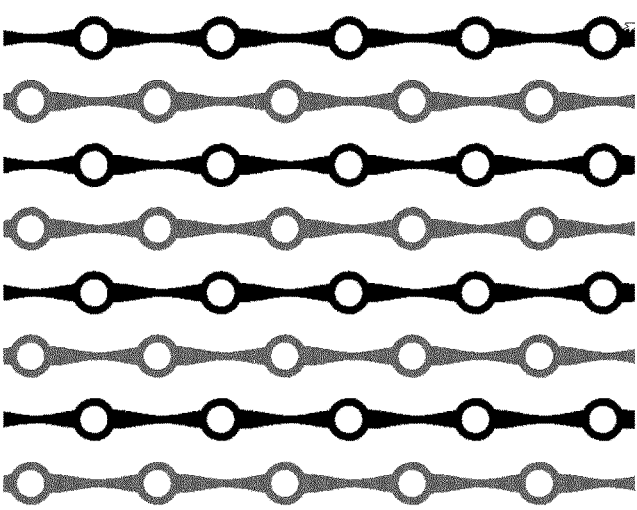
Figure 8D:
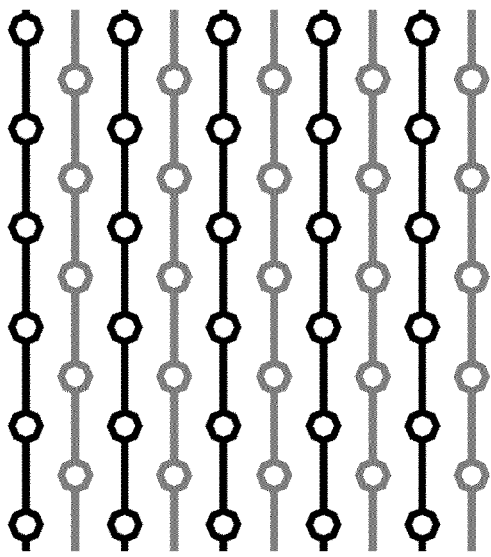
Figure 8E:
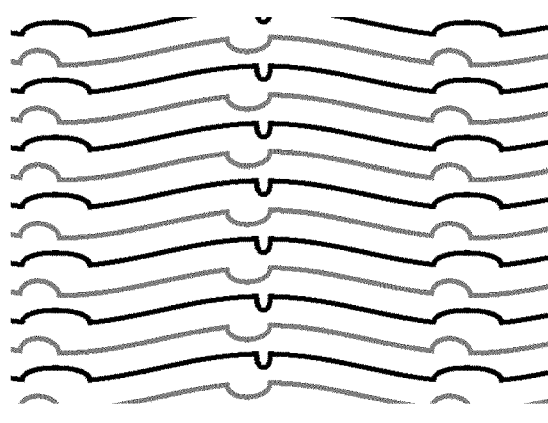
Figure 8F:
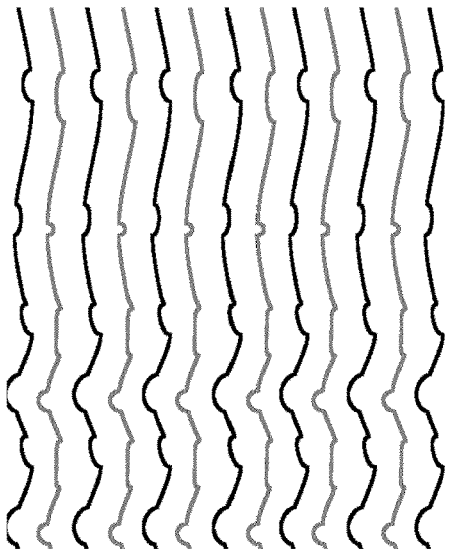

FIG. 7a schematically shows a front-view of an example of an embodiment of a building block;

FIG. 7b schematically shows a front-view of an example of an embodiment of a substrate, FIG. 7c schematically shows a front-view of an example of an embodiment of a substrate, FIG. 7b schematically shows an example of an embodiment of a substrate. The substrate is in particular useful for use in light modulator, e.g., of a kind described herein. Across the substrate multiple interdigitated driving electrodes are applied to the substrate.

The motivating example use of the substrate is in an electrophoretic light modulator. Typically, an electrophoretic light modulator comprising at least two substrates, each having at least two driving electrodes; this is not necessary though, for example, an electrophoretic light modulator may comprise a single substrate with 2 electrodes and an opposite substrate with 1 electrode. In any case, preferably, at least one of the substrates in the light modulator is according to an embodiment.

An embodiment of a light modulator comprises a first substrate according to an embodiment and a second substrate. The first and second substrates are arranged with inner sides opposite to each other. At least one driving electrode is applied to the inner side of the first substrate. An optical layer is arranged between the first and second substrates. A controller is configured to apply an electric potential to the at least one driving electrode causing modulation of the optical properties of the light modulator. One or both of the first and second substrates are transparent and/or translucent.

The optical layer arranged between the first and second substrates may comprise particles, e.g., suspended in a fluid. The controller may be configured to apply an electric potential to the driving electrodes causing the particles to move thus modulating the optical properties of the light modulator.

In an embodiment, the particles comprise electrically charged or chargeable particles, and the controller is configured to apply an electric potential to the driving electrode to obtain an electro-magnetic field providing electrophoretic movement of the particles. In an embodiment, the electro-magnetic field is arranged between at least two driving electrodes arranged on the same substrate or arranged on different substrates.

In an application of the light modulator for glazing both substrates are typically transparent. A light modulator is also referred to as an optical modulator.

Shown in FIG. 7b are two driving electrodes on the same surface. The two driving electrodes are indicated in FIG. 7b in two different dashing styles. There could be more than two electrodes on the same side of the substrate, e.g., to facilitate more fine-grained control of voltage differences across the substrate. The driving electrodes are applied to a same side of the substrate. Applying electrodes to a substrate may be done lithographically, e.g., using a mask representing the electrodes pattern. Electrodes may also be applied by embedding them in the substrate.

A driving electrode is electrically connected, e.g., has same electric potential everywhere. A driving electrode may comprise driving busses and main lines. At least, the main lines are interdigitated with main lines of a further driving electrode. Typically, the driving electrodes extend in a substantially straight line across the substrate, while the main lines are convoluted.

In an embodiment, the two substrates of an optical modular each have two electrodes arranged at its inner surface. Though, as mentioned, multiple electrodes on one or both substrates is not needed. For example, an embodiment of a light modulator comprises a first substrate and a second substrate. For example, the first substrate may comprise one driving electrode, the second substrate may not comprise driving electrodes. For example, the first substrate may comprise two driving electrodes, the second substrate may comprise one driving electrode. For example, the first substrate may comprise two driving electrodes, the second substrate may comprise two driving electrodes. For example, the first substrate may comprise more than two driving electrodes, the second substrate may comprise two or more driving electrodes.

Light modulators, wherein each substrate comprises two driving electrodes are used as a motivating example, though. Designs of substrates featuring two driving electrodes may be adapted to have a single driving electrode, e.g., by connecting the two driving electrodes, or by removing one of the driving electrodes. Adapting a substrate in such a manner may make it suitable for use in different technologies.

Each of the multiple driving electrodes are arranged in a pattern across the substrate. The multiple driving electrodes are arranged alternatingly with respect to each other on the substrate. Typically, a driving electrode comprises multiple main lines, that each stretch across the substrate. The main lines of the driving electrodes alternate, e.g., interdigitate. For example, in FIG. 7b the first driving electrode comprises main lines 711-714, and the second driving electrode comprises main lines 721-724. The driving electrodes are each driven by its driving bus. FIG. 7b shows two driving buses: driving bus 710 and driving bus 720. The driving electrodes also serve to connect the main lines together. For example, in FIG. 7b, the driving bus 710 drives and connects main lines 711-714; and the driving bus 720 drives and connects main lines 721-724. There can be more main lines than the four shown in this example. The use of main lines is advantageous as it reduces the length of the electrodes, but it is not necessary. A design using only one main line per driving electrode is not impossible, though having multiple is advantageous.

The multiple of main lines of the first and second electrode are arranged alternatingly with respect to each other on the substrate.

A motivating application for a substrate such as substrate 700 is in smart glazing, e.g., a light modulator, which may be applied in domestic housing, offices, green houses, cars, and the like. The level of transparency or reflectivity of the smart glazing can be adapted electrically. For example, in smart glazing two substrates such as substrate 700 would be stacked so that the sides on which the two electrodes are applied face each other. A fluid with particles is enclosed between the two substrates. Smart-glazing embodiments are further discussed herein. In an embodiment, electrodes, e.g., two or more electrodes are applied to one surface of each substrate. There could also be one, two or more electrodes on the other surface of substrate 700, e.g., to facilitate stacking of three or more substrates.

Some embodiments herein show examples of modulating a transparency or reflectivity level. Light modulators may be adapted for other optical effects. For example, if desired, embodiments could be modified to distinct levels of translucency instead of different levels of transparency. If desired, the type of particle that is used in an embodiment can be varied, e.g., to particles that differ in which wavelengths they absorb or reflect, and how specular of diffuse the reflection is. For example, in an embodiment, a light modulator can modulate distinct levels of reflection. Particles can also emit light. Stacking multiple optical layers further increases the possibilities.

Having two sets of alternating main lines is sufficient to provide electrically adaptable glazing; due to the alternating two sets the electric field at any part of the substrate can be controlled as two opposite electrodes border the part from two opposing sides.

Interestingly, the pattern in which the driving electrodes stretch across the substrate is created by multiple repeated building blocks. Shown in FIG. 7b, the driving electrodes on substrate 700 shows four blocks: blocks 741, 742, 743 and 744 which are all substantially the same. The number of building blocks may be larger than four. The building blocks repeat in both directions across the substrate, e.g., a first direction 791, e.g., an x-direction, shown horizontally in the figure, and a second direction 792, e.g., a y-direction, shown vertically in the figure.

For example, FIG. 7a schematically shows an example of an embodiment of a building block 740. Building block 740 comprises multiple interdigitated electrodes extending in at least 2 directions across the building block. Shown in FIG. 7a are four electrodes: electrode 731-734. When the building blocks are repeated across a substrate in two directions, the electrodes in the building block will form the driving electrodes, e.g., form the multiple main lines of the driving electrodes. Note that the building blocks are typically connected in a substrate-electrode design tool. Typically, a building block comprise more than four electrode lines. For example, in a range of embodiments between 8 and 12 main lines are used. The number of electrode lines can be much higher though. For example, a building block may comprise many short electrode lines near the edges that connect to lines of other building blocks when the block is repeated. Taking such short offshoots into account, the number of lines could go up to, say, 50. Clearly, when using larger building blocks, the number of electrode lines may go up as well. In an embodiment, the number of electrode lines in a building block is between 8 and 50, or between 8 and 25, etc.

The driving electrodes that are formed by repeating building blocks are connected to the driving busses. Typically, electrode lines in a building block are connected to electrode lines in neighboring blocks by mering corresponding electrode lines; this is not necessary though, between repeated building blocks connection zones can be inserted that connect corresponding electrode lines.

This step can connect up multiple of the main lines together thus forming a single driving electrode. FIG. 7b shows two connecting zones 719 and 729 in which the main lines belonging to the same driving electrode are connected to driving bus 710 and driving bus 720, respectively.

The electrodes that are shown in FIG. 7a are alternately dashed in the same dashing style of FIG. 7b. Indeed, it happens to be the case in this example, that a particular electrode of the building block of FIG. 7a will always end up in the first driving electrode or in the second electrode, e.g., as indicated in this case by the dashing style. This is however not necessarily the case. An electrode in a building block may end up as part of the first driving electrode or as part of the second driving electrode. This can change, e.g., as a result of the parity of the number of electrodes in the building block, the pattern in which the building blocks are repeated, etc.

For example, a particular pattern of repeated building blocks may be used for a light modulator with two driving electrodes, in which one might assign alternating main lines to the two driving electrodes. However, the same pattern of repeated building blocks may be used for a light modulator with three driving electrodes, in which one might assign every next set of three main lines to the three driving electrodes.

Furthermore, the building block shown in FIG. 7a is square, but this is also not needed. For example, a building block may be rectangular. In an embodiment, building block shape(s) could form a so-called tessellation. For example, a building block may be a triangle, a hexagon or even a combination of plane-filling shapes.

As said, FIGS. 7a and 7b are schematic. This is especially the case for the depiction of the electrodes. An electrode as shown in FIG. 7a is straight, and its length equals the length of a side of the building block. However, in an embodiment, an electrode on the building block is more convoluted as for at least one electrode in the multiple interdigitated electrodes in the building block a maximal length between any two points on said electrode measured along said electrode in the building block is at least 2 times the length of the diagonal of the building block unit. More convoluted electrode paths reduce interference effects.

An advantage of using a building block for the electrode pattern on a substrate is that the electrode design can be applied with a stepper. A stepper can for example, take the design of FIG. 7a and repeatedly apply it to a substrate, thus obtain the design of FIG. 7b. Interestingly, a building block may also be used as a patch antenna, e.g., for use in the first substrate. FIG. 7c schematically shows an example of an embodiment of a substrate. For example, the interdigitated electrodes on building block 741 of FIG. 7c may be connected to RF contact 610. For connection between building blocks a connection 760 is used. Whereas for electrodes only used for optical modulation a direct electric connection may be used, the block 741 is connected through an inductor. The inductor allows DC signals to pass, but not high frequency. The cut-off point may be a frequency above 1 KHz, or even above 100 Hz, and below 1 GHZ, or even 1 MHz. For example, the cut-off frequency may be 1 MHz, etc.

Figure 9A:
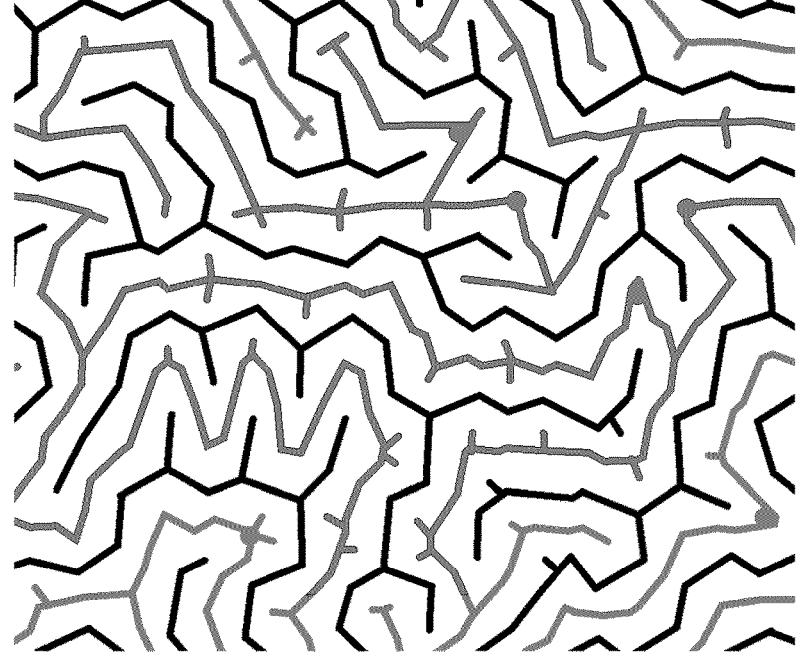
Figure 9B:
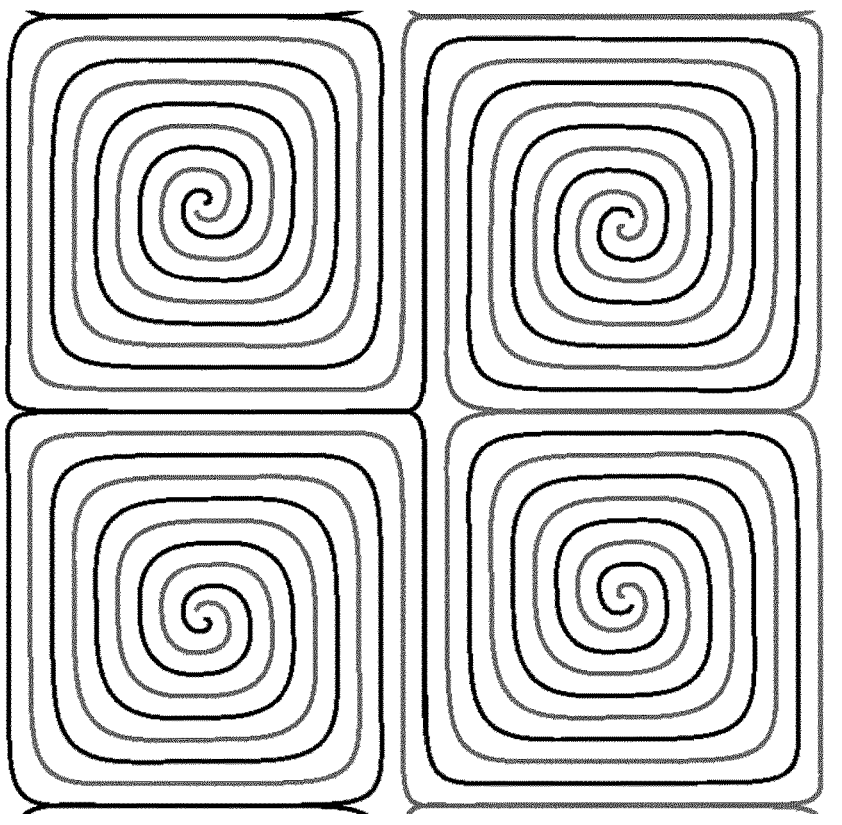

FIGS. 8a-8f schematically show a front-view of an example of an embodiment of interdigitated electrodes. FIGS. 9a-9b schematically show a front-view of an example of an embodiment of interdigitated electrodes.

These figures show designs with two driving electrodes on the surface of the substrate. Either design could be modified to have only a single driving electrodes on the surface of the substrate, e.g., by removing one of the two driving electrodes, or modified to have more than two electrodes. For example, such a modified design could be used in a light modulator that uses a substrate with a single electrode or with more than 2 electrodes.

The design shown in FIGS. 8a-8f, and 9a-9b can be realized in a single plane, without having crossing electrodes. In particular if these designs are connected to two driving buses, no crossing electrodes are needed. When more than two driving electrodes are used, or if more complicated electrode patterns are used, then crossing of the electrodes may be used, or may even become necessary. Such crossings are possible however for example, at the location where two electrode lines cross a dielectric material may be arranged between the electrodes. For example, such an insulator may be deposited at the crossing location. For example, a first driving electrode is in a first plane of the substrate and a second driving electrode is in a second plane of the substrate.

The smart glazing can also be used in other glazing applications, especially, were the amount of incident light is variable, e.g., buildings, offices, houses, green houses, sky-lights. Skylights are windows arranged in the ceiling to allow sunlight to enter the room. An embodiment of a glazing unit combines handling of electric wireless signals, e.g., for communication and/or obtaining energy, thermal isolation, and optical control of the glazing unit. Such a glazing unit will typically be applied in a building, but this is not necessary; for example, FIG. 10 schematically shows an example of an embodiment of a vehicle, in this case a car 20 having smart glazing for windows 21. This is a particularly advantageous embodiment, since while driving the level of incident lighting can change often and rapidly. Using smart glazing in a car has the advantage that light levels can be maintained as a constant level by adjusting the transparency of the car windows. Moreover, the reduced diffraction effect improves safety as it reduces driver distraction. Car 20 may comprise a controller configured for controlling the transparency or reflectivity of windows 21. Instead of a car as shown, the glazing unit may be applied in a camper, a boat or the like.

Figure 11A:
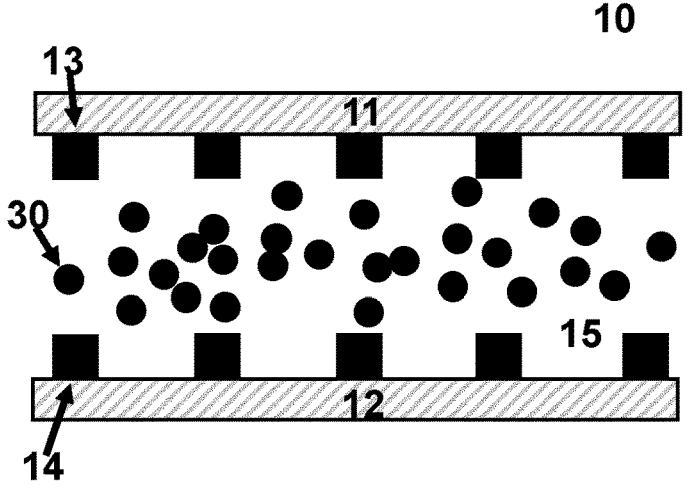
Figure 11B:
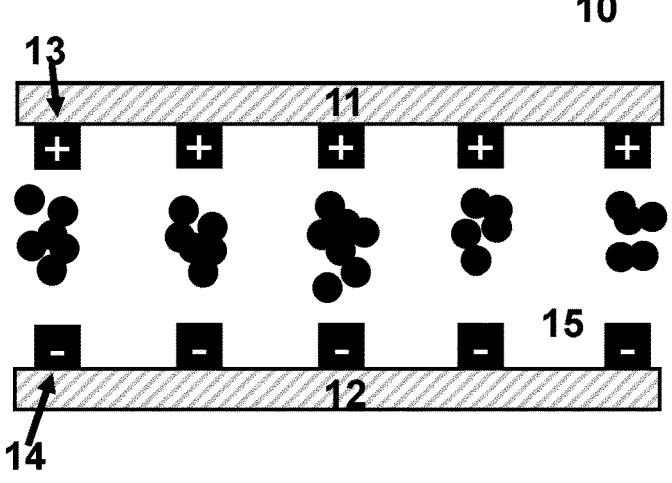
Figure 11C:
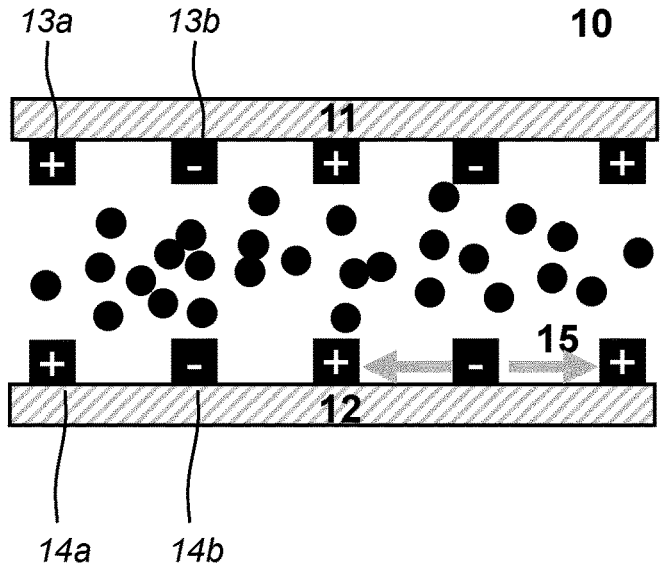

FIGS. 11a-11c show an example of an embodiment of optical modulation. Not shown in FIGS. 11a-11c is the handling of g. For example, the electrodes shown in FIGS. 11a-11c may be used for the handling of antenna signals as well. On the other hand, one or more additional antenna may be used, these are now shown separately.

The light modulator may have two optical states, e.g., a transparent state and a non-transparent state, or a reflective state and a non-reflective state. The light modulator, e.g., light modulator 10 or light modulator 40 may be configured to switch to the second optical state, e.g., the non-transparent state or to the non-reflective state by creating an alternating voltage on at least one of the first and second substrates, applying an alternating current between at least a first electrode and a second electrode on the first substrate and/or between a first electrode and a second electrode on the second substrate, and switch to the first optical state, e.g., the transparent state or to the reflective state by creating an alternating voltage between the first and second substrate, applying an alternating current between a first electrode on the first substrate and a first electrode on the second substrate, and/or between a second electrode on the first substrate and a second electrode on the second substrate.

The electrode pattern on the first substrate is arranged at least in part in the same pattern as a second electrode on the second substrate. Typically, the electrodes oppose each other, but the pattern of the first electrode and second electrode may also be shifted with respect to each other.

A protective coating may be provided on at least a part of the inner surface area of at least one of the first substrate and the second substrate is provided.

A driving signal applied to driving electrodes typically has a varying voltage. For example, a power provider may be operated at an AC frequency for switching to a transparent state or to a non-transparent state. Such a signal may have a frequency between, say, 1-1000 Hz. A balanced electrolysis current may be obtained by continuously switching the polarity of oppositely charged electrodes on the first and on the second substrates and/or between the first and the second substrates.

FIGS. 11a-11b schematically show a side view of an embodiment of a light modulator in use. Applying an electric field to the electrodes on the substrates causes an electrical force on the particles. Using this effect, the particles can be moved around and so different transparency or reflectivity states can be caused in the light modulator. A controller may control the electric field, e.g., its amplitude, frequency, and phase. In an embodiment, the controller is connected to at least four electrodes: two for each substrate. But more electrodes may be used and connected to the controller; for example, more than 2 electrodes may be used for a substrate to better fine-tune grey scaling, and driving to non-transparent or non-reflective state. Multiple electrodes may also be used to support multiple segments on the substrate.

FIG. 11a shows the light modulator without an electric field being applied. No electric force is yet applied on particles 30 suspended in fluid 15, in FIG. 11a.

In the configuration shown in FIG. 11a, a conducting electrode pattern, arranged on the top substrate is completely or substantially aligned with a conducting electrode pattern on the bottom substrate. The conducting electrode pattern may be deposited on a transparent or (partially) reflective glass substrate or may be embedded in a plastics substrate, etc. Alignment between the top-electrode pattern and the bottom electrode pattern contributes to a wider range of achievable levels of transparency or reflectivity. However, alignment is not needed, as similar effects can be obtained without alignment. Without alignment, a range of transparency or reflectivity is likewise obtained.

Note that in these examples, reference is made to the top substrate and the bottom substrate to refer to substrate that is higher or lower on the page. The same substrates could also be referred to, e.g., as the front substrate and back substrate, since in a glazing application, the substrates would be aligned vertically rather than horizontally.

FIG. 11b shows the light modulator wherein, say at an instance P1, a potential +V1 is applied to each microwire electrode on the top substrate, while a negative voltage, say −V1, is applied to each microwire electrode of the bottom substrate. Thus, in this case, the same positive potential is applied to all electrodes 13, and the same negative potential is applied to electrodes 14. The difference in potential causes negatively charged particles to flow to the vicinity of the electrodes of the top substrate, where the particles will substantially align with the top electrodes. As a result, if both the top and bottom substrate are transparent, the transparency of light modulator 10 will increase. Likewise, if, e.g., the top substrate is transparent and the bottom substrate is reflective, the reflectivity of light modulator 10 will increase If the solution contains positively charged particles they will flow to the vicinity of the electrodes of the bottom substrate, where those particles will substantially align with the bottom electrodes.

A similar transparency or reflectivity can be achieved, when in a second instance, P2, of the on-state, the voltages of the top electrodes and bottom electrodes are reversed in contrast to the instance of P1. In the instance P2, the voltage of each electrode on of the top substrate are now supplied with a negative potential-V1 while the voltages of the aligned electrodes of the bottom substrate are supplied with a positive potential. This state is similar to the state shown in FIG. 11b, but with top and bottom substrates reversed. Also in this configuration the transparency or reflectivity of light modulator 10 is high.

Interestingly, by switching between a positive potential at electrodes at the top substrate, e.g., as shown as electrodes 13 in FIG. 11b (and a negative potential on electrodes 14), and a positive potential at electrodes at the bottom substrate, e.g., as shown as electrodes 14 in FIG. 11b, the transparency or reflectivity can be maintained, while decreasing corrosion damage to the electrodes. This alternating electric field can be achieved by applying alternating electric potentials to the top and bottom electrodes.

Applying a waveform is optional, but it is a useful measure to increase the lifetime of the light modulator by reducing corrosion. Corrosion can form for example, when using copper electrodes, since copper ions dissolve in an ionic fluid at one substrate and flow to electrode on the opposite substrate, where they deposit. By applying a waveform the direction of copper ion transport is frequently reversed, thus reducing corrosion damage. Between the two instances P1 and P2 the corrosion current between the two substrates is balanced or substantially, e.g., >95%, balanced, e.g., as corrosion rate of an electrode of the top plate occurs there is a balancing deposition of copper on the bottom electrode between each instance of time, P1 and vice versa in instance P2. Therefore, the particles are transitioning or migrating continuously between top and bottom electrode, and the light modulator or smart window is always in the on-state while the dynamic electrolysis current between the top and bottom electrode is constant thus there is no or a negligible net loss of electrode material on the top and bottom substrates.

FIG. 11c shows how a state of decreased transparency or reflectivity can be obtained. An alternating voltage is applied on the same substrate. For example, in an embodiment a potential +V2 is applied a first electrode and the next immediate neighboring electrode has an opposite potential −V2 etc., as shown in FIG. 11c. This can be obtained by applying the potential +V2 to electrode 13a and the opposite potential −V2 to electrode 13b. On the opposite substrate the potential +V2 may be applied to electrode 14a and the opposite potential −V2 to electrode 14b. For example, the electrodes may be arranged so that the electrodes on the substrates are aligned; an electrode on the top substrate having an opposite electrode on the bottom substrate, and vice versa. For example, to decrease transparency or reflectivity, the opposite electrode may receive the same potential, while neighboring electrodes receive an opposite potential. An embodiment is shown in FIG. 11c, wherein four electrodes are indicated with the reference numbers 13a, 13b, 14a and 14b, and the rest of the electrodes continue to alternate.

By using this AC drive cycle between top and bottom substrates, diagonal and lateral electric fields are generated between the two substrates thereby causing haphazard diffusion of the particles thereby creating the closed state of the light modulator. As a result of this configuration, the particles migrate diagonally and laterally between the top and bottom substrate and diffusion of particles into the visible aperture of the light modulator contributes to the closed, opaque state of the light modulator.

As for the transparent state shown in FIG. 11b, a waveform may be applied to the electrodes, e.g., so that electrodes that are shown in FIG. 11b with a positive potential become negative and vice versa. As in FIG. 11b applying a waveform, e.g., between electrodes 13a and 13b and between 14a and 14b reduces corrosion damage to the electrodes.

The AC drive cycle may be implemented by using an interdigitated line configuration combining the top and bottom electrode configuration shown in plan view in FIGS. 5, 6a-6d, etc. The extent with which transparency or reflectivity is increased or decreased in FIGS. 11b and 11c depends on the voltage and frequencies difference. By varying the voltage difference, the amount by which the transparency or reflectivity increases, respectively, decreases, is controlled. For example, a curve representing light transmission versus voltage may be determined, e.g., measured. To obtain a particular level of light transmission, e.g., a particular transparency, e.g., a particular grey-scale level, the corresponding voltage, e.g., AC voltage may be applied. By interpolating the signals for a transparent or for a non-transparent state, levels in between transparent and non-transparent may be obtained. Likewise, a curve representing light reflection versus voltage may be determined, e.g., measured. To obtain a particular level of reflectivity, the corresponding voltage, e.g., AC voltage may be applied. By interpolating the signals for a reflective or for a non-reflective state, levels in between reflective and non-reflective may be obtained.

Different electrode patterns may be used, for a light modulator. The electrode patterns may each provide a range of greyscales, e.g., levels of transparency or reflectivity, that the light modulator can attain. However, the particular range of greyscale for any particular electrode pattern may be different from another electrode pattern. In other words, although different patterns give an increased transparency or reflectivity or an increased opacity, the exact response to a drive signal depends on many factors, including the particular pattern that is used. The variations in the optical properties of a light modulator may have a fine resolution, e.g., below 1 mm. Note that no pixilation of the light modulator is needed to achieve different optical patterns, e.g., logos, visible in the light modulator.

This effect may be used to embed visible images in the light modulator by locally changing the electrode pattern on the substrates of a light modulator. For example, one may locally have greyscales that have a permanent off-set in greyscale relative to each other, because of a different electrode pattern. For example, by locally changing the electrode pattern or its pitch, the maximum transparency or reflectivity can be altered.

The result is an area on the light modulator which has a different intensity of greyscale, e.g., a different greyscale, or of coloring. The area may have the same color-point, though. In an embodiment, they may switch together with the rest of the window, although at a different rate. For example, even if the same voltage is applied to the electrodes in two different areas, they cause a different transparency state, e.g., different transmission level, due to different electrode patterns. For example, a curve representing transmission versus voltage may be shifted. For example, if voltage control is changed in the same way in both areas, then in both areas light transmission may change, but with a different amount. An area may also be made less response to a drive signal by reducing the density of electrodes; in particular, an area may be made not to switch at all, e.g., by not applying electrodes in the area.

For example, the electrode material may be copper, aluminum, gold, indium-tin oxide (ITO), etc. ITO is transparent while Cu/Al is reflective, thus using a different electrode material, a different appearance may be obtained, irrespective of the voltage driving. Likewise, different materials with a different resistance, will give rise to a different electric field. For example, ITO will have a smaller electric field, even though driven with the same voltage.

An embodiment of a method of modulating light, comprises applying an electric potential to multiple driving electrodes applied to two opposing substrates to obtain an electro-magnetic field between the multiple driving electrodes providing electrophoretic movement of the particles towards or from one of the multiple driving electrodes causing modulation of light shining through the substrates, wherein the two opposing substrates are as in an embodiment.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Driving the electrodes may use a signal with a selected maximum amplitude, which corresponds to one of multiple levels of transparency or reflectivity in the light modulator. The signal may be alternating current or alternating voltage.

The invention claimed is:

1. A glazing unit configured for reception of radio frequency signals, the glazing unit comprising:
 a first pane and a second pane, the first and second pane being parallel to each other,
 a first substrate and a second substrate,
  the first substrate and the second substrate being arranged in the glazing unit parallel to the first and second pane,
  at least two interdigitated electrodes being arranged on a second side of the first substrate, the second side of the first substrate being opposite the first side of the first substrate, the second side of the first substrate facing a first side of the second substrate,
  at least two interdigitated electrodes being arranged on the first side of the second substrate, the first side of the second substrate facing the first substrate,
 at least one antenna for reception of a radio frequency signal, the antenna being arranged on a side of the first substrate or on a side of the first pane,
 an optical layer arranged between the first and second substrate, charged or chargeable particles being in fluidic suspension in the optical layer, the particles and electrodes on the first and second substrate being configured to cooperate in electrophoretic modulation of the particles' position causing modulation of light passing through the glazing unit,
 wherein the at least two interdigitated electrodes on the first substrate or part thereof are configured as the at least one antenna, and the at least one antenna comprises one or more of:
 a first antenna configured to capture electric power from the received radio frequency signal,
 a second antenna configured to recover RF modulated data from the received radio frequency signal,
 a third antenna configured to re-transmit the recover RF modulated data after re-modulation.

2. A glazing unit as in claim 1, wherein
the first side of the first substrate is facing the first pane,
 a second side of the second substrate facing the second pane, the first and second substrate being arranged inside the glazing unit, or
 a second side of the second substrate facing the first pane, the first and second substrate being arranged at an exterior side of the glazing unit.

3. A glazing unit according to claim 1, wherein the first pane is arranged for facing a building exterior, the second pane being arranged for facing the building interior, or wherein the first pane is arranged for facing a vehicle exterior, the second pane being arranged for facing the vehicle interior.

4. A glazing unit according to claim 1, the glazing unit comprising:
 a clip surrounding the glazing unit, the first and second pane being attached to the clip, the clip being arranged to space the first and second pane from each other.

5. A glazing unit according to claim 1, a capacitor connected to the antenna to tune the antenna to a frequency above 100 MHz.

6. A glazing unit according to claim 1, wherein the interdigitated electrodes on the first and second substrate are controlled with an electric signal with a frequency below 1k Hz.

7. A glazing unit according to claim 1, wherein the at least one antenna comprise one or more patch elements configured as patch antenna.

8. A glazing unit according to claim 1, comprising a radio frequency demodulator, and a radio frequency modulator.

9. A glazing unit as in claim 1, comprising a controller connected to the at least two interdigitated electrodes on the first substrate and/or to the at least two interdigitated electrodes on the second substrate for controlling the optical layer, the controller being configured to receive a control signal instructing the optical layer control.

10. A glazing unit as in claim 1, wherein the controller is arranged to obtain electrical power from the antenna signal for driving, at least in part, the electrodes on the first and second substrates.

11. A glazing unit configured for reception of radio frequency signals, the glazing unit comprising:
    a first pane and a second pane, the first and second pane being parallel to each other,
    a first substrate and a second substrate,
        the first substrate and the second substrate being arranged in the glazing unit parallel to the first and second pane,
        at least two interdigitated electrodes being arranged on a second side of the first substrate, the second side of the first substrate being opposite the first side of the first substrate, the second side of the first substrate facing a first side of the second substrate,
        at least two interdigitated electrodes being arranged on the first side of the second substrate, the first side of the second substrate facing the first substrate,
    at least one antenna for reception of a radio frequency signal, the antenna being arranged on a side of the first substrate or on a side of the first pane,
    an optical layer arranged between the first and second substrate, charged or chargeable particles being in fluidic suspension in the optical layer, the particles and electrodes on the first and second substrate being configured to cooperate in electrophoretic modulation of the particles' position causing modulation of light passing through the glazing unit,
    wherein the at least two interdigitated electrodes on the first substrate or part thereof are configured as the at least one antenna,
    wherein the glazing unit further comprises a controller, the controller being arranged to recover data from the antenna signal communicated in said antenna signal, and/or of for re-modulating said recovered data and transmitting the re-modulated data over a further antenna.

12. A glazing unit as in claim 1, wherein an isolating layer is arranged between the first substrate and the second pane, wherein the isolating layer may be vacuum or comprise an isolating gas.

13. A glazing unit configured for reception of radio frequency signals, the glazing unit comprising:
    a first pane and a second pane, the first and second pane being parallel to each other,
    a first substrate and a second substrate,
        the first substrate and the second substrate being arranged in the glazing unit parallel to the first and second pane,
        at least two interdigitated electrodes being arranged on a second side of the first substrate, the second side of the first substrate being opposite the first side of the first substrate, the second side of the first substrate facing a first side of the second substrate,
        at least two interdigitated electrodes being arranged on the first side of the second substrate, the first side of the second substrate facing the first substrate, at least one antenna for reception of a radio frequency signal, the antenna being arranged on a side of the first substrate or on a side of the first pane,
    an optical layer arranged between the first and second substrate, charged or chargeable particles being in fluidic suspension in the optical layer, the particles and electrodes on the first and second substrate being configured to cooperate in electrophoretic modulation of the particles' position causing modulation of light passing through the glazing unit,
    wherein the at least two interdigitated electrodes on the first substrate or part thereof are configured as the at least one antenna,
    wherein the glazing unit further comprises a capacitor, wherein the capacitor comprises multiple interdigitated dielectric fins and conducting fins, a ground plane being connected a first outer dielectric fin and a connector to a second outer dielectric fin, a first connection of antenna being connected to the first outer dielectric fin and a second connection of antenna being connected to the connector.

14. A glazing unit configured for reception of radio frequency signals, the glazing unit comprising:
    a first pane and a second pane, the first and second pane being parallel to each other,
    a first substrate and a second substrate,
        the first substrate and the second substrate being arranged in the glazing unit parallel to the first and second pane,
        at least two interdigitated electrodes being arranged on a second side of the first substrate, the second side of the first substrate being opposite the first side of the first substrate, the second side of the first substrate facing a first side of the second substrate,
        at least two interdigitated electrodes being arranged on the first side of the second substrate, the first side of the second substrate facing the first substrate,
    at least one antenna for reception of a radio frequency signal, the antenna being arranged on a side of the first substrate or on a side of the first pane,
    an optical layer arranged between the first and second substrate, charged or chargeable particles being in fluidic suspension in the optical layer, the particles and electrodes on the first and second substrate being configured to cooperate in electrophoretic modulation of the particles' position causing modulation of light passing through the glazing unit,
    wherein the at least two interdigitated electrodes on the first substrate or part thereof are configured as the at least one antenna,
    wherein the glazing unit further comprises from the exterior of the first pane: the at least one antenna, a dielectric layer, a transparent conductive layer, and the first substrate, in that order, the dielectric layer isolating the at least one antenna from the transparent conductive layer.

15. A glazing unit configured for reception of radio frequency signals, the glazing unit comprising:
    a first pane and a second pane, the first and second pane being parallel to each other,
    a first substrate and a second substrate,
        the first substrate and the second substrate being arranged in the glazing unit parallel to the first and second pane,
        at least two interdigitated electrodes being arranged on a second side of the first substrate, the second side of the first substrate being opposite the first side of the first substrate, the second side of the first substrate facing a first side of the second substrate, at least two interdigitated electrodes being arranged on the first side of the second substrate, the first side of the second substrate facing the first substrate, at least one antenna for reception of a radio frequency signal, the antenna being arranged on a side of the first substrate or on a side of the first pane, an optical layer arranged between the first and second substrate, charged or chargeable particles being in fluidic suspension in the optical layer, the particles and electrodes on the first and second substrate being configured to cooperate in electrophoretic modulation of the particles' position causing modulation of light passing through the glazing unit, wherein the at least two interdigitated electrodes on the first substrate or part thereof are configured as the at least one antenna, wherein arranged on the first side of the first substrate is an ITO layer, a dielectric layer, and the at least one antenna, or arranged on a side of the first pane facing away of the first substrate is a transparent conductive layer, a dielectric layer, and the at least one antenna, or arranged on a side of the first pane facing away of the first substrate are the at least one antenna and arranged on the first side of the first substrate is a transparent conductive layer.

16. A glazing unit as in claim 1, wherein the at least one antenna are arranged on the second side of the first substrate among the at least two interdigitated electrodes.

17. A glazing unit configured for reception of radio frequency signals, the glazing unit comprising:

a first pane and a second pane, the first and second pane being parallel to each other, a first substrate and a second substrate, the first substrate and the second substrate being arranged in the glazing unit parallel to the first and second pane, at least two interdigitated electrodes being arranged on a second side of the first substrate, the second side of the first substrate being opposite the first side of the first substrate, the second side of the first substrate facing a first side of the second substrate, at least two interdigitated electrodes being arranged on the first side of the second substrate, the first side of the second substrate facing the first substrate, at least one antenna for reception of a radio frequency signal, the antenna being arranged on a side of the first substrate or on a side of the first pane, an optical layer arranged between the first and second substrate, charged or chargeable particles being in fluidic suspension in the optical layer, the particles and electrodes on the first and second substrate being configured to cooperate in electrophoretic modulation of the particles' position causing modulation of light passing through the glazing unit, wherein the at least two interdigitated electrodes on the first substrate or part thereof are configured as the at least one antenna, wherein the at least two interdigitated electrodes on the second side of the first substrate comprise one or more patches, the patches being isolated from the remainder of the at least two interdigitated electrodes on the second side of the first substrate for high frequency signals but not for low frequency signals.

18. A glazing unit as in claim 1, wherein the first pane and the first substrate are combined.

19. A first substrate having a first side and a second side, arranged on the first side of the first substrate is a transparent conductive layer, a dielectric layer, and at least one antenna for reception of a radio frequency signal, and arranged on the second side of the first substrate are at least two interdigitated electrodes, wherein the at least two interdigitated electrodes on the first substrate or part thereof are configured as the at least one antenna, and the at least one antenna comprises one or more of: a first antenna configured to capture electric power from the received radio frequency signal, a second antenna configured to recover RF modulated data from the received radio frequency signal, a third antenna configured to re-transmit the recovered RF modulated data after re-modulation.

* * * * *